(12) United States Patent
Ophardt et al.

(10) Patent No.: US 11,669,808 B2
(45) Date of Patent: Jun. 6, 2023

(54) SERVICING PATHWAY SELECTION FOR CRITICAL SMART DISPENSER IN MULTIPLE WASHROOM FACILITIES

(71) Applicant: OP-Hygiene IP GmbH, Niederbipp (CH)

(72) Inventors: Heiner Ophardt, Arisdorf (CH); Rudolpho Gian-Franco Gugliotta, Volkingen (DE)

(73) Assignee: OP-Hygiene IP GmbH, Niederbipp (CH)

( * ) Notice: Subject to any disclaimer, the term of this patent is extended or adjusted under 35 U.S.C. 154(b) by 0 days.

(21) Appl. No.: 17/734,265

(22) Filed: May 2, 2022

(65) Prior Publication Data

US 2022/0261770 A1   Aug. 18, 2022

Related U.S. Application Data

(63) Continuation of application No. 17/116,351, filed on Dec. 9, 2020, now Pat. No. 11,354,628, which is a continuation of application No. 16/662,824, filed on Oct. 24, 2019, now Pat. No. 10,891,596, which is a (Continued)

(51) Int. Cl.

| G06Q 10/10 | (2012.01) |
|---|---|
| G06Q 20/18 | (2012.01) |
| G07F 17/18 | (2006.01) |
| G06Q 10/06 | (2012.01) |
| G06Q 10/08 | (2012.01) |
| G07F 9/02 | (2006.01) |
| G06Q 10/1093 | (2023.01) |

(Continued)

(52) U.S. Cl.
CPC ... *G06Q 10/1097* (2013.01); *G06Q 10/06311* (2013.01); *G06Q 10/063116* (2013.01); *G06Q 10/087* (2013.01); *G06Q 20/18* (2013.01); *G07F 9/026* (2013.01); *G07F 17/18* (2013.01)

(58) Field of Classification Search
CPC .............. G06Q 10/06; G06Q 10/0631; G06Q 10/063116; G06Q 10/1097; G06Q 10/06311; G06Q 10/063114; G06Q 10/047

See application file for complete search history.

(56) References Cited

U.S. PATENT DOCUMENTS

| 4,782,451 A * | 11/1988 | Mazzarella | ........... G01F 23/802 |
|---|---|---|---|
| | | | 340/870.16 |
| 5,128,861 A * | 7/1992 | Kagami | ............... G06Q 10/087 |
| | | | 705/28 |

(Continued)

OTHER PUBLICATIONS

Pillac, Victor et al., On the Dynamic Technician Routing and Scheduling Problem Research Report Ecole des Mines de Nantes, Oct. 9, 2012 (Year: 2012).*

(Continued)

*Primary Examiner* — Scott L Jarrett

(74) *Attorney, Agent, or Firm* — Thorpe North & Western, LLP; Peter M. de Jonge; Kurt Hendricks

(57) ABSTRACT

A method of managing a plurality of washrooms in a facility for servicing by service personnel and, more particularly, for establishing servicing operations which provide for service of at least selected of the dispensers before their consumable product supply falls below a pre-selected refill value.

20 Claims, 7 Drawing Sheets

Related U.S. Application Data continuation of application No. 15/604,883, filed on May 25, 2017, now Pat. No. 10,496,961.

(60) Provisional application No. 62/342,124, filed on May 26, 2016.

(51) Int. Cl.
*G06Q 10/0631* (2023.01)
*G06Q 10/087* (2023.01)

(56) References Cited

U.S. PATENT DOCUMENTS

| | | | | |
|---|---|---|---|---|
| 5,154,314 A * | 10/1992 | Van Wormer | G06Q 10/087 | 235/94 R |
| 5,351,725 A * | 10/1994 | Suthergreen | G01F 23/802 | 73/299 |
| 5,691,919 A * | 11/1997 | Gemmell | A47K 10/36 | 242/563.2 |
| 5,945,910 A * | 8/1999 | Gorra | G16H 40/20 | 702/176 |
| 5,983,198 A * | 11/1999 | Mowery | G06Q 10/08 | 705/16 |
| 6,360,181 B1 * | 3/2002 | Gemmell | G07F 9/002 | 702/128 |
| 6,377,868 B1 * | 4/2002 | Gardner, Jr. | D06F 95/00 | 700/244 |
| 6,411,920 B1 * | 6/2002 | McConnell | A47K 10/42 | 242/564.1 |
| 6,510,384 B2 * | 1/2003 | Okano | G01C 21/343 | 701/533 |
| 6,609,101 B1 * | 8/2003 | Landvater | G06Q 30/0202 | 705/7.31 |
| 6,954,737 B2 * | 10/2005 | Kalantar | G06Q 10/06311 | 705/50 |
| 6,990,458 B2 * | 1/2006 | Harrison | G06Q 10/10 | 705/7.14 |
| 7,044,421 B1 * | 5/2006 | Omdoll | A47K 10/36 | 242/563 |
| 7,370,824 B1 * | 5/2008 | Osborne | A47K 10/36 | 242/563.2 |
| 7,499,869 B2 * | 3/2009 | Iknoian | G06Q 10/063116 | 705/7.21 |
| 7,774,096 B2 * | 8/2010 | Goerg | A47K 10/3662 | 700/244 |
| 7,996,108 B2 * | 8/2011 | Yardley | B65H 35/0006 | 700/244 |
| 8,265,796 B2 * | 9/2012 | Beebe | H04L 67/125 | 222/23 |
| 8,396,590 B1 * | 3/2013 | Nallappan | G06Q 10/06 | 700/241 |
| 8,600,547 B2 * | 12/2013 | Petersen | B65H 43/00 | 700/244 |
| 9,027,788 B2 * | 5/2015 | Ophardt | G01F 23/2928 | 222/64 |
| 9,524,604 B2 * | 12/2016 | Erb | G07F 9/026 | |
| 9,645,561 B2 * | 5/2017 | Borke | A47K 10/36 | |
| 9,677,924 B2 * | 6/2017 | Maguin | F01N 3/2066 | |
| 9,830,764 B1 * | 11/2017 | Murphy | G07F 9/023 | |
| 9,864,351 B2 * | 1/2018 | Slupik | H04L 12/2825 | |
| 10,072,962 B2 * | 9/2018 | Ismail | D06F 33/47 | |
| 10,130,221 B2 * | 11/2018 | Borke | A47K 10/36 | |
| 10,223,667 B2 * | 3/2019 | Repensek | G06Q 20/102 | |
| 10,482,400 B2 * | 11/2019 | Guo | G06Q 10/08355 | |
| 2003/0115088 A1 * | 6/2003 | Thompson | G06Q 30/0203 | 705/7.14 |
| 2004/0019513 A1 * | 1/2004 | Colalancia | G06Q 10/1097 | 705/7.15 |
| 2004/0078257 A1 * | 4/2004 | Schweitzer | G06Q 10/1097 | 705/7.26 |
| 2004/0162748 A1 * | 8/2004 | Vogel | G06Q 10/06315 | 705/7.22 |
| 2004/0193472 A1 * | 9/2004 | Ramakrishnan | G06Q 10/063116 | 705/7.16 |
| 2004/0220844 A1 * | 11/2004 | Sanville | G06Q 10/06316 | 705/7.26 |
| 2005/0049942 A1 * | 3/2005 | Richard | G06Q 10/06 | 705/28 |
| 2005/0171634 A1 * | 8/2005 | York | G07F 11/68 | 700/231 |
| 2005/0222889 A1 * | 10/2005 | Lai | G06Q 10/06 | 705/7.41 |
| 2006/0217876 A1 * | 9/2006 | Houri | G06Q 10/06 | 340/995.19 |
| 2006/0259309 A1 * | 11/2006 | Pigott | G06Q 30/0282 | 705/347 |
| 2008/0025734 A1 * | 1/2008 | Kehoe | G03G 15/55 | 399/9 |
| 2008/0319807 A1 * | 12/2008 | Weiss | G06Q 10/02 | 705/5 |
| 2009/0119142 A1 * | 5/2009 | Yenni | H04L 67/12 | 705/7.15 |
| 2009/0165890 A1 * | 7/2009 | Komura | G06Q 50/30 | 705/28 |
| 2009/0187452 A1 * | 7/2009 | Takaoku | G06Q 10/0639 | 706/46 |
| 2009/0204256 A1 * | 8/2009 | Wegelin | G01F 17/00 | 700/244 |
| 2012/0173134 A1 * | 7/2012 | Gutman | G01C 21/3476 | 701/400 |
| 2013/0240554 A1 * | 9/2013 | Strahlin | A47K 10/32 | 221/6 |
| 2014/0195257 A1 * | 7/2014 | Perkins | G16H 40/20 | 705/2 |
| 2015/0206077 A1 * | 7/2015 | Himmelmann | G06Q 10/063118 | 340/870.07 |
| 2015/0228181 A1 * | 8/2015 | Himmelmann | G06Q 10/063118 | 340/573.1 |
| 2016/0093195 A1 * | 3/2016 | Ophardt | H04L 63/10 | 705/14.33 |
| 2016/0342929 A1 * | 11/2016 | Tanaka | G06Q 10/06314 | |
| 2017/0344957 A1 * | 11/2017 | Ophardt | G07F 9/026 | |
| 2018/0075375 A1 * | 3/2018 | Becker | G06Q 20/308 | |
| 2018/0101880 A1 * | 4/2018 | Colantoni | G06Q 30/0601 | |
| 2018/0354777 A1 * | 12/2018 | Slater | G06Q 10/087 | |
| 2019/0258997 A1 * | 8/2019 | Williams | G06Q 10/06311 | |

OTHER PUBLICATIONS

Zone Cleaning: How to Plan Your Cleaning Technician's Route TheJanitorialStore.com, 2014 (Year: 2014).*

Team Cleaning: How to Plan Your Cleaning Technician's Route TheJanitorialStore.com, Aug. 2014 (Year: 2014).*

Team Cleaning—introduction and skills workshop handbook Cleaning Consultants, TeamCleaning.com, Mar. 2015 (Year: 2015).*

Castillo-Salazar, J. Arturo et al., A Survey on Workforce Scheduling and Routing Problems Practice and Theory of Automated Timetabling, Aug. 2012 (Year: 2012).*

* cited by examiner

| Washrooms | Visitors | D1 | D2 | T | P | B |
|---|---|---|---|---|---|---|
| WR1 | 4017 | 50% | 100% | 100% | 0% | 97% |
| WR2 | 9 | 50% | 100% | 98% | 0% | 100% |

FIG. 6

SERVICING PATHWAY SELECTION FOR CRITICAL SMART DISPENSER IN MULTIPLE WASHROOM FACILITIES

RELATED APPLICATION

This application is a continuation of co-pending U.S. patent application Ser. No. 17/116,351 filed Dec. 9, 2020, which is a continuation of U.S. patent application Ser. No. 16/662,824 filed Oct. 24, 2019, which has issued as U.S. Pat. No. 10,891,596, which is a continuation of U.S. patent application Ser. No. 15/604,883 filed May 25, 2017, which has issued as U.S. Pat. No. 10,496,961, and claims the benefit of 35 U.S.C. 120.

SCOPE OF THE INVENTION

This invention relates to a method of managing a plurality of washrooms in a facility for servicing by service personnel and, more particularly, for establishing servicing operations which provide for service of at least selected of the dispensers before their consumable product supply falls below a pre-selected refill value.

BACKGROUND OF THE INVENTION

Facilities such as office buildings, sport complexes and the like have washrooms containing dispensers of consumable products such as liquid hand cleaner, paper hand towels and toilet paper which is consumed in use and must be filled by service personnel. The management of such facilities currently suffer the disadvantages of failing to provide with the servicing of the dispensers by service personnel which ensure refilling of dispensers as desired or which optimizes the use of service personnel for such servicing. This is particularly a disadvantage in larger facilities with many washrooms and many different and varying usage patterns for the different washrooms particularly having regard to special events with higher or low usage and difficulties in scheduling an availability of service personnel, reduced inventories of consumable products and/or breakdown of at least some of the dispensers.

SUMMARY OF THE INVENTION

To at least partially overcome these disadvantages, the present invention provides an apparatus, system and methods for managing a plurality of washrooms in a facility for servicing by service personnel which selects servicing operations to provide for service of the dispensers before the dispensers are emptied beyond a pre-set refill value. Preferably, the method includes establishing routes for service personnel for each servicing operation by selecting pathways for the service personnel to travel along to service dispensers which minimizes the time for such service operation. Preferably, the method establishes servicing operations which provide for servicing of key dispensers which would not be selected for refilling in a given service operation based on the refill time of each dispenser but are selected so as to extend their refill time, as to a time after a future pre-determined time, for example, to accommodate predicted high usage.

In one aspect, the present invention provides a method of managing a plurality of washrooms in a facility for servicing by service personal comprising:

providing in a facility a plurality of washrooms, each at a fixed location within the facility with each washroom having one or more dispensers of consumable product and with each dispenser having a maximum capacity for the consumable product, providing one or more service personnel for replenishing the consumable product in the dispensers, establishing for each dispenser a predictive consumption profile representing the product estimated to be available in each dispenser with time into the future, establishing for each dispenser a refill value for the consumable product available in each dispenser, establishing for each dispenser a refill time when the consumable product available in each dispenser is expected to reach the refill value as a function of the predictive consumption profile for that dispenser, establishing at least one or more servicing operations, each servicing operation having one of the service personnel, a start time and a selected group of the dispensers;

selecting the service personnel, the start time and selected group of the dispensers for each servicing operation as a service function which provides for service of each of the dispensers before their respective refill time.

In another aspect, the present invention provides a method of managing a plurality of washrooms in a facility for servicing by service personal comprising:

providing in a facility a plurality of washrooms each at a fixed location within the facility with each washroom having one or more dispensers of consumable product and with each dispenser having a maximum capacity for the consumable product, providing one or more service personnel for replenishing the consumable product in the dispensers, establishing for each dispenser a predictive consumption profile representing the product estimated to be available in each dispenser with time into the future, establishing for each dispenser a refill value for the consumable product available in each dispenser, establishing for each dispenser a refill time when the consumable product available in each dispenser is expected to reach the refill value as a function of the predictive consumption profile for that dispenser, establishing for each dispenser a service time required for the service personnel to refill the consumable product in that dispenser, determining one or more pathways for service personnel to travel between each washroom within the facility and a travel time for each pathway, establishing a route for each service personnel by selecting successive pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value.

Dispensers, in accordance with the present invention, preferably have a system for monitoring the amount of consumable product available for use in the dispenser. Preferably, the sensors for monitoring the supply of consumable products in each dispenser is a real time sensor which can provide preferably by wireless communication information to a server regarding the consumable product in the dispenser. With some aspects of the invention, it is desirable to monitor the location of service personnel and mobile service carts carrying supplies of consumable product. Such monitoring may be carried out by various means including GPS monitors as on portable devices such as cell phones and mobile wireless sensoring, for example, by sensing the relative location of a tag or other device on the service personnel or the mobile cart with an array of spaced sensors within a facility.

A typical facility to which the method of the present invention is applicable is a facility with a plurality of washrooms to be serviced by a service personnel with each of the washrooms having one or more dispensers of consumable products, for example, with the dispensers being paper towel dispensers, hand cleaning fluid dispensers, toilet paper dispensers and a waste bin. The waste bin may be considered a type of dispenser with a negative value, that is, with a consumable product being the amount of empty space in the waste bin and with the refilling of the consumable space being accomplished by a service personnel emptying the waste bin. In the facility, a predictive consumption profile is established representing the consumable product estimated to be available in each dispenser with time into the future. In an initial start-up situation, the predictive consumption profile may be chosen, preferably based on some estimate as to the number of persons that would use washrooms in the period of time and thereby estimating the extent to which each of the dispensers may be used with time. In some preferred arrangements of the present invention, the level of consumable product in each dispenser is monitored in time by a level sensing device and the data from such monitoring is maintained so as to provide a historical database of consumption for each dispenser. With the passage of time, the predictive consumption profile for each dispenser is preferably modified having regard to historical data received from the dispensers.

Each dispenser is preferably given a refill value representing an amount of consumable product available in the dispenser when the dispenser is preferred to be refilled. Having regard to the predictive consumption profile for each dispenser, a refill time can be calculated estimating when the consumable product available in each dispenser is expected to reach the refill level. In accordance with the present invention, servicing operations are structured by which one of the service personnel at a start date will be assigned a task of refilling a selective group of dispensers. Preferably, in accordance with the present invention, for each servicing operation, a selection of the service personnel, the start time and the selected group of dispensers for each servicing operation is made having regard to a service function which includes providing for service of each of the dispensers in the facility before their respective refill time. The service function may, however, include additional considerations. As one example, it may be expected that there is, for example, in a future period, for example, a special event at a church facility during a weekday in which there will be increased usage of certain key dispensers of the dispensers in the facility. During the time that the special event is occurring, difficulties may arise in respect of the service personnel servicing the key dispenser. Prior to the special event, the method may on the mere criteria of servicing each dispenser before their respective fill time, not require filling of one of the key dispensers during the special event. In accordance with the present invention, the service function can, for example, shortly prior to the special event, require refilling of the key dispensers with a view to ensuring the key dispensers will, for a longer period of time during the special event and preferably for a time until after the special event, not require refilling. For example, prior to the special event, a key dispenser may be provided which has a refill value representing 20% of the capacity of the dispenser. Prior to the special event, the key dispenser may have 75% of its capacity available. While such key dispensers would not on the basis of a mere service function that provides for a filling of that dispenser before its respective refill time, select the key dispenser for refilling before the special event, due to the existence of the special event with the service function requiring refilling of the key dispenser to a 100% level as with a view to having the key dispenser have additional consumable product which may let the key dispenser have product for dispensing through the special event, or as far as possible in the special event or, preferably, until after the special event or at least with minimizing the number of times that that key dispenser might need to be refilled during the special event.

In accordance with the present invention, the physical components within the facility may be given a fixed location. For example, a fixed location of each of the dispensers, a fixed location of a storage room in which product is to be located as well as hallways, pathways and other pathways for travel within the facility and notably between the dispensers and fixed storage rooms and other rooms such as offices where service personnel can rest can be input into the system. Preferably, the location of the service personnel and other mobile items such as mobile service carts may be monitored and tracked.

Preferably, there is input into the system either by initial estimates or from historical data of the pathways between different locations in the facilities, the time for each pathway. The method preferably for each servicing operation establishes a route for each selected service personnel by selecting successive of the pathways for each service personnel to travel along to service a selected group of the dispensers as a service function which minimizes the sum of travel times of the pathways of the route and service times as for each dispenser serviced and loading of inventory as from a fixed storage room onto a mobile cart. This service function in establishing a route that minimizes the time for the servicing operation is preferably in conjunction with the service function providing for the servicing of selected dispensers for the consumable product before each dispenser reaches the refill value.

In any facility, it is within the capability of the facility manager to vary the number of washrooms that are available and operative, to vary the number of dispensers, to vary the capacity of the dispensers, to vary the number of service personnel, to vary the time that the service personnel are available to work as reflected by start and stop time for shifts for the personnel, amongst other things. In respect of individual dispensers in a washroom, the dispensers can be selected having regard to the capacity of consumable product. For example, in the case of a hand cleaning fluid dispenser, dispensers which may be chosen, for example, to have pre-selected available volumes of liquid such as, for example, half a liter, one liter or two liters of fluid. Additionally, rather than have but one dispenser in a washroom, it is possible to increase the capacity in that washroom by having two or more dispensers.

In accordance with the present invention, a method includes attempting to optimize the costs of servicing the dispensers in the facility including varying the numbers of dispensers, servicing personnel, the nature of the dispensers, the shifts of the personnel and the like. The present invention provides a method for calculating the costs of servicing the dispensers in a facility over time and varying variables so as to determine optimum configurations for the variable factors. For example, in high use washrooms, the selection of dispensers to have a larger product capacity may reduce the need for the number of service personnel or the number of shifts and thus provide an overall cost reduction in the servicing of the facility.

In accordance with the present invention, the method can provide for servicing operations to cover emergency situations in which there may be a shortage of supply of product, unusual usage considerations, failure of certain dispensers to operate, the unavailability of service staff or the inability to reach certain of the dispensers. Such factors can be used to adapt these service functions so as, for example, to merely provide service operations to service critical dispensers. For example, critical dispensers might be characterized as being toilet paper dispensers in some or all of the washrooms being refilled by the refilled time yet letting other dispensers not being refilled and becoming empty.

The present invention provides a $1^{st}$ method of managing a plurality of washrooms in a facility for servicing by service personnel. The method preferably includes in a first aspect:

1. providing in a facility a plurality of washrooms, each at a fixed location within the facility with each washroom having one or more dispensers of consumable product and with each dispenser having a maximum capacity for the consumable product;

2. providing one or more service personnel for replenishing the consumable product in the dispensers;

3. establishing for each dispenser a predictive consumption profile representing the product estimated to be available in each dispenser with time into the future;

4. establishing for each dispenser a refill value for the consumable product available in each dispenser;

5. establishing for each dispenser a refill time when the consumable product available in each dispenser is expected to reach the refill value as a function of the predictive consumption profile for that dispenser;

6. establishing at least one or more servicing operations;

7. each servicing operation having one of the service personnel, a start time and a selected group of the dispensers; and 8. selecting the service personnel, the start time and selected group of the dispensers for each servicing operation as a service function which provides for service of each of the dispensers before their respective refill time.

As a $2^{nd}$ method, the invention provides the $1^{st}$ method to include the selecting of the service personnel, the start time and selected group of the dispensers for each servicing operation is with the service function:

(a) providing for service of each of the dispensers before their respective refill time, and/or (b) providing for servicing of predetermined one or more key dispensers of the dispensers to extend the refill time for each key dispenser.

As a $3^{rd}$ method, the invention provides the $1^{st}$ method and the $2^{nd}$ method to include establishing a series of successive of the servicing operations, wherein the selecting of the service personnel, the start time and selected group of the dispensers for each servicing operation is with the service function providing for service of each of the dispensers before their respective refill time and/or providing for servicing of each key dispenser which would not be selected for refilling in a given servicing operation based on the refill time of each key dispensers but are selected so as to extend the refill time for each key dispenser by which each key dispenser needs to be refilled in a subsequent servicing operation.

As a $4^{th}$ method, in the $2^{nd}$ and $3^{rd}$ methods, the servicing of each key dispenser to extend the refill time for each key dispenser extends the refill time for that key dispenser to a time after a predetermined time.

As a $5^{th}$ method, in the $4^{th}$ method, the predetermined time is selected having regard to factors selected from the group of:

(a) ensuring the consumable product is available in each key dispenser until after a period of time in which usage of each key dispenser is predicted to be high, (b) ensuring the consumable product is available in each key dispenser until after a period of time in which availability of the consumable product in each key dispenser is determined to be of high importance, (c) ensuring the consumable product is available in each key dispenser until after a period of time in which servicing of each key is not possible, (d) ensuring the consumable product is available in each key dispenser until after a period of time in which the service personnel are not available for servicing of each key dispenser, and (e) ensuring the consumable product is available in each key dispenser until after a period of time in which consumable product is not available for servicing of each key dispenser.

As a $6^{th}$ method, each of the $1^{st}$ to $5^{th}$ methods include:

establishing for each dispenser a service time required for the service personnel to refill the consumable product in that dispenser, and determining one or more pathways for service personnel to travel and a travel time for each pathway, the pathways including pathways between locations within the facility, the locations including a location of each dispenser within the facility.

As a $7^{th}$ method, the method of claim 6 includes:

providing one or more offices within the facility where one or more service personnel are located when not servicing the dispensers, the locations including a location of each office.

As an $8^{th}$ method, the $6^{th}$ and $7^{th}$ methods include:

providing one or more product storage capabilities within the facility, the locations including a location of each product storage capability.

As a $9^{th}$ method, the $6^{th}$, $7^{th}$ and $8^{th}$ methods are carried out with the product storage capabilities including a mobile storage cart, monitoring in real time the location of each mobile storage cart within the facility.

As a $10^{th}$ method, in the $9^{th}$ method, the locations include the location of each mobile storage cart within the facility as monitored in real time.

As an $11^{th}$ method, the $8^{th}$ to $10^{th}$ methods include storing the consumable product at the product storage capabilities, and monitoring the consumable product at each product storage capability.

As a $12^{th}$ method, the $6^{th}$ to $11^{th}$ methods include for each servicing operation establishing a listing of consumable product required to perform the servicing operation with time, and selecting the product storage capability from which the consumable product for each servicing operation is to be supplied to fulfill the listing with time.

As a $13^{th}$ method, the $6^{th}$ to $12^{th}$ methods include monitoring in real time the location of each service personnel within the facility.

As a $14^{th}$ method, in the $6^{th}$ to $13^{th}$ methods, the locations include the location of each service operation of each personnel within the facility as monitored in real time.

As a 15th method, the 1st to 14th methods include:

for each servicing operation establishing a route for each selected service personnel for that servicing operation by selecting successive of the pathways for each service personnel to travel along to service the selected group of the dispensers as a function which (a) minimizes the sum of the travel times of the pathways of the route and the service times for each dispenser serviced and preferably also (b) provides for service of each of the selected group of dispensers before the consumable product available in any dispenser is expected to reach the refill value.

In a 16th method, the 1st to 15th methods include communicating each servicing operation to the service personnel.

In a 17th method, the 16th method includes communicating each servicing operation to the service personnel is by wireless communication.

In an 18th method, the 15th to 17th methods include monitoring in real time the consumable product available in each dispenser.

In a 19th method, the 18th method includes from time to time establishing for each dispenser the predictive consumption profile based on a function of (a) the monitoring in real time the consumable product available in each dispenser and/or (b) predicted usage of the consumable product in each dispenser each dispenser.

In a 20th method, the 1st to 19th methods include varying the predictive consumption profile to accommodate one or more special usage events of the facility over one or more selected period of time.

In a 21st method, the 1st to 20th methods include:

selecting the number of service personnel, and/or selecting a work shift schedule which establishes a start time and stop time of a work shift for each service personnel when each service personnel will be available for servicing.

In a 22nd method the 21st method includes periodically:

establishing a cost per shift of each service personnel, a calculation step of performing an optimizing calculation which over a selected period of time for the servicing of all dispensers determines the routes required to service all dispensers and a sum of the costs of the shifts of all service personnel, having regard to a selected input matrix of values for the capacity of each dispenser, the refill value for each dispenser, the number of service personnel, the shifts, and the start and stop times for the shifts, repeatedly varying the selected input matrix values and repeating the calculation step, comparing the sum of the costs of the shifts of all service personnel for each calculation step and identifying one of the selected input matrix values as an optimum input matrix values that minimizes the sum of the costs of the shifts of all service personnel, modifying the method to adopt the optimum input matrix values including modifying the dispensers to provide for the optimum capacity of each dispenser if different than the then existing capacity of each dispenser, and operating the facility with the selected input matrix values for the refill value for each dispenser, number of service personnel, the shifts, and the start and stop times for the shifts.

In a 22nd method, in the 1st to 21st methods, the refill value for some of the dispensers is selected to be a nil value when the consumable product available in each dispenser is nil.

In a 23rd method, in the 22nd method, the dispensers include a toilet paper dispenser and at least one dispenser associated with the toilet paper dispenser selected from the group of a paper hand towel dispenser, hand cleaner dispenser and a waste bin, and in which the refill value for toilet paper dispensers is selected to be greater than a nil value when the consumable product available in that dispenser is nil.

In a 24th method, in the 22nd or 23rd method, the refill value of at least one paper hand towel dispenser in each washroom is selected to be greater than the nil value, and the refill value of other paper hand towel dispenser in the same washroom are selected to be a nil value.

In a 25th method, in the 1st to 24th methods, the selecting of the service personnel, the start time and selected group of the dispensers for each servicing operation is with the service function optionally establishing a route for each service personnel by selecting successive pathways for each service personnel to travel along to service dispensers as a function which provides for service of each of the dispensers so as to prevent all dispensers of the same type in the same washroom being simultaneously below the refill value.

In a 26th method, the 1st to 25th methods include:

providing a visual indication on each dispenser that signals to a user whether the dispenser does or does not contain the consumable product available to be dispensed.

In a 27th method, the 1st to 26th methods include:

monitoring each dispenser to determine whether or not the dispenser is operable to dispense the consumable product, and providing a visual indication on each dispenser that signals to a user whether the dispenser is or is not operable to dispense the consumable product.

In a 28th method, the 1st to 27th methods when, due to a lack of one or more of consumable product, service personnel, access of service personnel to any dispenser, or operability of any dispenser such that the servicing operations cannot be established to selecting successive pathways for each selected service personnel to travel along to service the dispensers of the selected group of dispensers as a service function which provides for service of each of the dispensers before the refill time for each of the dispensers, then adopting an emergency mode of selecting of the service personnel, the start time and selected group of the dispensers for each servicing operation in which the selecting of the service personnel, the start time and selected group of the dispensers for each servicing operation is with the service function providing for the selection of one or more critical dispensers of the dispensers and refilling of each critical dispenser before their respective refill time.

In a 29th method, the 28th method includes reviewing and re-establishing of the refill value for each critical dispenser.

In a 30th method, the 28th or 29th method includes establishing a series of successive of the servicing operations, wherein the selecting of the service personnel, the start time and selected group of the dispensers for each servicing operation is with the service function providing for service of each critical dispensers before their respective refill time and providing for servicing of each critical dispenser which would not be selected for refilling in a given servicing operation based on the refill time of each critical dispenser but are selected so as to extend the refill time for each critical dispenser by which each critical dispenser needs to be refilled in a subsequent servicing operation.

In a 31st method, in the 28th to 30th methods, the servicing of each critical dispenser to extend the refill time for each critical dispenser extends the refill time for that each critical dispenser to a time after a predetermined time.

In a 32nd method, in the 31st method, the predetermined time is selected having regard to factors selected from the group:

ensuring the consumable product is available in each critical dispenser until after a period of time in which other of the dispensers are not operative, (b) ensuring the consumable product is available in each critical dispenser until after a period of time in which there is the lack of one or more of consumable product, (c) ensuring the consumable product is available in each critical dispenser until after a period of time in which there is a lack of service personnel, and (d) ensuring the consumable product is available in each critical dispenser until after a period of time in which there is a lack of access of service personnel to any dispenser.

A $33^{rd}$ method in accordance with the present invention is a method of managing a plurality of washrooms in a facility for servicing by service personal comprising:

providing in a facility a plurality of washrooms each at a fixed location within the facility with each washroom having one or more dispensers of consumable product and with each dispenser having a maximum capacity for the consumable product, providing one or more service personnel for replenishing the consumable product in the dispensers, establishing for each dispenser a predictive consumption profile representing the product estimated to be available in each dispenser with time into the future, establishing for each dispenser a refill value for the consumable product available in each dispenser, establishing for each dispenser a refill time when the consumable product available in each dispenser is expected to reach the refill value as a function of the predictive consumption profile for that dispenser, establishing for each dispenser a service time required for the service personnel to refill the consumable product in that dispenser, determining one or more pathways for service personnel to travel between each washroom within the facility and a travel time for each pathway, establishing a route for each service personnel by selecting successive pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value.

In a $34^{th}$ method, the $33^{rd}$ method includes:

providing one or more offices within the facility where one or more service personnel are located when not servicing the dispensers, determining one or more pathways for service personnel to travel between each office and the washrooms within the facility and a travel time for each pathway, establishing the route for each service personnel including both the pathways for service personnel to travel between each washroom within the facility and the pathways for service personnel to travel between each office and the washrooms within the facility by selecting successive of the pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value.

In a $35^{th}$ method, the $33^{rd}$ method includes:

providing one or more product storage spaces in the facility, determining one or more pathways for service personnel to travel between each product storage space and each washroom within the facility and a travel time for each pathway, storing the consumable product at the storage spaces, monitoring the consumable product at each storage space, establishing the route for each service personnel including both the pathways for service personnel to travel between each product storage space and each washroom within the facility and the pathways for service personnel to travel between each washroom within the facility, and the pathways for service personnel to travel between each office and the washrooms within the facility by selecting successive of the pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value.

In a $36^{th}$ method, the $34^{th}$ method includes:

providing one or more product storage spaces in the facility, determining one or more pathways for service personnel to travel between each product storage space, each office and each washroom within the facility and a travel time for each pathway, storing the consumable product at the storage spaces, monitoring the consumable product at each storage space, establishing the route for each service personnel including the pathways for service personnel to travel between each product storage space, each office and each washroom within the facility, the pathways for service personnel to travel between each washroom within the facility, and the pathways for service personnel to travel between each office and the washroom within the facility by selecting successive of the pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach a nil value.

In a $37^{th}$ method, the $33^{rd}$ to $36^{th}$ methods include monitoring in real time the consumable product available in each dispenser.

In a $38^{th}$ method, the $37^{th}$ method includes establishing for each dispenser the predictive consumption profile based on a function of (a) historical monitoring of each dispenser and (b) predicted usage of each dispenser.

In a $39^{th}$ method, the $33^{rd}$ to $38^{th}$ methods include:

selecting the number of service personnel, and selecting a work shift schedule which establishes the start time and stop time of a work shift for each service personnel when each service personnel will be available for servicing.

In a $40^{th}$ method, the $39^{th}$ method includes periodically:

establishing a cost per shift of each service personnel, a calculation step of performing an optimizing calculation which over a selected period of time for the servicing of all dispensers determines the routes required to service all dispensers and a sum of the costs of the shifts of all service personnel, having regard to a selected input matrix of values for the capacity of each dispenser, the refill value for each dispenser, the number of service personnel, the shifts, and the start and stop times for the shifts, repeatedly varying the selected input matrix values and repeating the calculation step, comparing the sum of the costs of the shifts of all service personnel for each calculation step and identifying one of the selected input matrix values as an optimum input matrix values that minimizes the sum of the costs of the shifts of all service personnel, modifying the method to adopt the optimum input matrix values including modifying the dispensers to provide for the optimum capacity of each dispenser if different than the then existing capacity of each dispenser, and operating the facility with the selected input matrix values for the refill value for each dispenser, number of service personnel, the shifts, and the start and stop times for the shifts.

In a $41^{st}$ method, the $33^{rd}$ to $40^{th}$ methods include varying the predictive consumption profile to accommodate special usage events of the facility over a selected period of time.

In a $42^{nd}$ method, the $33^{rd}$ to $41^{st}$ methods include monitoring in real time the location of each service personnel within the facility.

In a $43^{rd}$ method, the $42^{nd}$ method includes modifying the route in real time having regard to the real time the location of each service personnel within the facility and the consumable product available in each dispenser in real time.

In a $44^{th}$ method, in the $33^{rd}$ to $43^{rd}$ methods, the refill value for selected dispensers is selected to be a nil value when the consumable product available in each dispenser is nil.

In a $45^{th}$ method, in the $33^{rd}$ to $44^{th}$ methods, the dispensers include toilet paper dispensers, paper hand towel dispensers and hand cleaner dispensers, and in which the refill value for toilet paper dispensers is selected to be greater than a nil value when the consumable product available in that dispenser is nil.

In a $46^{th}$ method, in the $45^{th}$ method, the refill value at least one paper hand towel dispenser in each washroom is selected to be greater than a nil value when the consumable product available in that dispenser is nil, and the refill value other paper hand towel dispenser in the same washroom are selected to be a nil value when the consumable product available in each dispenser is nil.

In a $47^{th}$ method, in any one of the $33^{rd}$ to $46^{th}$ methods, there is substituted for the wording of the last paragraph in method 33, the following wording: "establishing a route for each service personnel by selecting successive pathways for each service personnel to travel along to service dispensers as a function which (a) minimizes the sum of the travel times of the pathways of the route and the service times for each dispenser serviced, (b) provides for service of each of the dispensers either: before the consumable product available in any dispenser is expected to reach the refill value, or to minimize the length of time that all dispensers of the same type in the same washroom are simultaneously in the refill value or below.

A $48^{th}$ method of managing a plurality of washrooms in a facility for servicing by service personal comprising:

providing in a facility a plurality of washrooms, each at a fixed location within the facility with each washroom having one or more dispensers of consumable product and with each dispenser having a maximum capacity for the consumable product, providing one or more service personnel for replenishing the consumable product in the dispensers, establishing for each dispenser a predictive consumption profile representing the product estimated to be available in each dispenser with time into the future, establishing for each dispenser a refill value for the consumable product available in each dispenser, establishing for each dispenser a refill time when the consumable product available in each dispenser is expected to reach the refill value as a function of the predictive consumption profile for that dispenser, establishing for each dispenser a service time required for the service personnel to refill the consumable product in that dispenser, determining one or more pathways for service personnel to travel between each washroom within the facility and a travel time for each pathway, establishing a series of successive servicing operations, each servicing operation having a selected one of the service personnel not occupied concurrently in another of the servicing operations, a start time, a start location, a selected group of the dispensers and a route for servicing the selected group of the dispensers;

the start time, route, and selected group of the dispensers for of the servicing operations established selecting successive pathways for each selected service personnel to travel along to service the dispensers of the selected group of dispensers as a service function which (a) minimizes the sum of the travel times of the pathways of the route and the service times for each dispenser serviced, (b) provides for service of each of the dispensers before the refill time for each of the dispensers, and (c) provides for servicing of any dispenser to extend the refill time for that dispenser after the servicing operation to extend the time of the next servicing operation for servicing of that dispenser.

A $49^{th}$ method of managing a plurality of washrooms in a facility for servicing by service personal comprising:

providing in a facility a plurality of washrooms each at a fixed location within the facility with each washroom having one or more dispensers of consumable product and with each dispenser having a maximum capacity for the consumable product, designating selected of the dispensers as key dispensers, providing one or more service personnel for replenishing the consumable product in the dispensers, establishing for each dispenser a predictive consumption profile representing the product estimated to be available in each dispenser with time into the future, establishing for each dispenser a refill value for the consumable product available in each dispenser, establishing for each dispenser refill time when the consumable product available in each dispenser is expected to reach the refill value as a function of the predictive consumption profile for that dispenser, establishing for each dispenser a service time required for the service personnel to refill the consumable product in that dispenser, determining one or more pathways for service personnel to travel between each washroom within the facility and a travel time for each pathway, establishing a series of successive servicing operations, each servicing operation having a selected one of the service personnel not occupied concurrently in another of the servicing operations, a start time, a start location, a selected group of the dispensers and a route for servicing the selected group of the dispensers;

the start time, route, and selected group of the dispensers for of the servicing operations established selecting successive pathways for each selected service personnel to travel along to service the dispensers of the selected group of dispensers as a service function which (a) minimizes the sum of the travel times of the pathways of the route and the service times for each dispenser serviced, (b) provides for service of each of the key dispensers before the refill time for each of the key dispensers, and (c) provides for servicing of any key dispenser to extend the refill time for that key dispenser after the servicing operation to extend the time of the next servicing operation for servicing of that key dispenser.

In a 50$^{th}$ method, in the 49$^{th}$ method, item (c) provides for servicing of any key dispenser to extend the refill time for that key dispenser after the servicing operation to extend the time of the next servicing operation for servicing of that key dispenser beyond a predetermined time.

In a 51$^{st}$ method, in the 50$^{th}$ method, the predetermined time is selected having regard to factors selected from the group of:

ensuring the consumable product is available in each key dispenser during a period of time in which usage of the washrooms is anticipated to be high or the service personnel are not available.

In a 52$^{nd}$ method, the 49 to 51$^{st}$ methods include:
monitoring the consumable product available in each dispenser, and
establishing for each dispenser the refill time when the consumable product available in each dispenser is expected to reach a refill value as a function of (a) the monitoring of that dispenser, and (b) the predictive consumption profile for that dispenser.

In a 53$^{rd}$ method, each of the 49$^{th}$ to 52$^{nd}$ methods include establishing for selected of the dispenser the refill value a condition in which the dispenser contains none of the consumable product.

In a 54$^{th}$ method, in any preceding method, the predictive consumption profile is established from time to time from data selected from the group of:

historical data acquired by monitoring the consumable product available in each dispenser with time, and
data selected based on predicted use of the facility during selected periods of time.

The present invention in one aspect provides a method of managing a plurality of washrooms in a facility for servicing by service personal. The method comprises various steps.

As one step, the method includes providing in a facility a plurality of washrooms, each at a fixed location within the facility with each washroom having one or more dispensers of consumable product and with each dispenser having a maximum capacity for the consumable product. As one example, the facility may have offices or various rooms of which some may comprise washrooms by reason of having one or more dispensers of consumable product such as hand cleaning fluid dispensers of, for example, liquid soap or alcohol based disinfectant fluid from reservoirs that contain the consumable product, and which reservoirs have a capacity to hold a maximum volume. The dispensers may also comprise dispensers of paper consumable products such as paper hand towels and toilet paper as in rolls or sheets with each dispenser having a capability to hold a maximum capacity of the paper product. The dispensers also include waste bins with a maximum capacity to hold a maximum volume of waste.

The method includes the step of providing one or more service personnel for replenishing the consumable product in the dispensers. The service personnel are, for example, one or more persons or employees who have the capability to move about the facility and perform various service operations as may be desired.

The method includes establishing for each dispenser a predictive consumption profile representing the product estimated to be available in each dispenser with time into the future. For each dispenser, the consumable product in the dispenser is determined at a point in time. For example, preferably, the dispenser has a sensor that measures the amount of the consumable product in the dispenser at a known time and, for example, communicates this data to a central computer or processor. Preferably, the sensor measures the amount of consumable product in the dispenser in real time and communicates to the computer in real time. As another example, the dispenser may be filled to a known level with the consumable product by a service personnel, often to the maximum capacity for the dispenser and the service personnel communicates the filling, the level to which there is filling and the time of filling to the computer. For each dispenser, the consumption of its consumable product is determined at different points in time. The consumption represents the reduction of the consumable product in the dispenser with time. With a dispenser with real time sensing of the amount of consumable product in the dispenser is known with the passage of time and, at any time, the rate at which consumable product has been dispensed with time can be used to predict based on historical data when the consumable product in the dispenser at any time may be expected to be reduced to nil at some future time. Historical data from repeated cycles of filling the dispenser and use of the dispenser can permit the calculation of predictive formulas which estimate a predictive consumption profile for the dispenser describing the amount of consumable product in the dispenser as a function of time. For dispensers that do not have sensors or real time sensing, dispensing historical data as available on the dispenser can be used to estimate a predictive consumption profile. The data to be used may be lesser data points than with a dispenser with real time sensing limited possibly to data on when the dispenser was filled, to what extent and when the dispenser was next observed and the amount of consumable product in the dispenser when next observed. Dispensers without sensors may nevertheless come to have developed an accurate consumption predictive profile with time as the amount of historical data available to the computer increases. Thus, the method may include from, time to time, establishing for each dispenser the predictive consumption profile based on a function of (a) any monitoring in real time the consumable product available in each dispenser, and (b) predicted usage of the consumable product in each dispenser.

The method includes establishing for each dispenser a refill value for the consumable product available in each dispenser. The refill value for a dispenser is the amount of the consumable product desired to be in the dispenser at the time that the dispenser is to be serviced by service personnel to refill the dispenser. The refill value may vary widely and be selected, for example, in a range of from 0% to 50%, without limiting the refill value. For example, in a toilet stall which has one dispenser of toilet paper, the refill value may be selected so that even if consumption may vary widely from the predictive profile for the dispenser, there will be with a high probability at least some toilet paper in a private toilet stall at all times. The refill value may be selected to be 15 to 30%, for example, as towards erring on a probability basis on having at least some toilet paper in the stall at all times and considering having at least some toilet paper as important. In a washroom with a permanent water supply with two or more dispensers of hand cleaning soap communally available and visible to each user, each dispenser may be selected to have a refill value of say 0% to 10% expecting that on a probability basis that at least one of the dispensers may have at least some soap and considering having at least some soap not critical since typically a user's hands could be washed merely with water.

The method includes establishing for each dispenser a refill time when the consumable product available in each dispenser is expected to reach the refill value as a function of the predictive consumption profile for that dispenser. Given that the quantity of consumable product in the dispenser has been determined at a known time, and given that the consumptive profile of the dispenser has been established, the consumptive profile is used to estimate the time from when the quantity of consumable product is known in the dispenser to calculate a time when the quantity of consumptive product in the dispenser will equal the refill value for the dispenser, a selected refill value for a dispenser.

The method includes establishing at least one or more servicing operations, with each servicing operation having one of the service personnel, a start time and a selected group of the dispensers. The servicing operations are selected having regard to servicing operations that are desired on the selected group of dispensers. In one case, the servicing operation may merely be the refilling of the dispensers with consumable product. However, other servicing operations may be selected including without limitation monitoring of any dispenser as to its status and replacing batteries in a battery powered dispenser before the storage capacity of the battery is consumed. The start time is a selected time that the servicing operations are to commence, such as a start time of a shift for the selected service personnel or a time when the service personnel is expected to become available.

The method includes selecting the service personnel, the start time and the selected group of the dispensers for each servicing operation as a service function which provides for service of each of the dispensers before their respective refill time. The method preferably includes selecting of the service personnel, the start time and selected group of the dispensers for each servicing operation is with the service function:

(a) providing for service of each of the dispensers before their respective refill time, and (b) providing for servicing of predetermined one or more key dispensers of the dispensers to extend the refill time for each key dispenser. The servicing of each dispenser before their refill time will ensure that each dispenser has consumable product at all times as is generally desirable. Providing for servicing of some of the dispensers designated to be key dispensers is to extend the time that each key dispenser may be expected to have consumable product available. Key dispensers may be selected as key dispensers on many different bases, including dispensers that may be expected to have high usage and need to be serviced frequently, dispensers whose usage anticipates high usage in the near future and dispensers which are desired to have consumable product for use with high probability.

Preferably, the method includes establishing a series of successive of the servicing operations, wherein the selecting of the service personnel, the start time and selected groups of the dispensers for each servicing operation is with the service function providing for service of each of the dispensers before their respective refill time and providing for servicing of each key dispenser which would not be selected for refilling in a given servicing operation based on the refill time of each key dispensers but are selected so as to extend the refill time for each key dispenser by which each key dispenser needs to be refilled in a subsequent servicing operation. Preferably, the servicing of each key dispenser to extend the refill time for each key dispenser extends the refill time for that each key dispenser to a time after a predetermined time, that is preferably selected having regard to factors selected from the group of:

(a) ensuring the consumable product is available in each key dispenser until after a period of time in which usage of each key dispenser is predicted to be high, (b) ensuring the consumable product is available in each key dispenser until after a period of time in which availability of the consumable product in each key dispenser is determined to be of high importance, (c) ensuring the consumable product is available in each key dispenser until after a period of time in which servicing of each key is not possible, (d) ensuring the consumable product is available in each key dispenser until after a period of time in which the service personnel are not available for servicing of each key dispenser, and (e) ensuring the consumable product is available in each key dispenser until after a period of time in which consumable product is not available for servicing of each key dispenser.

The methods preferably include establishing for each dispenser a service time required for the service personnel to refill the consumable product in that dispenser, and determining one or more pathways for service personnel to travel and a travel time for each pathway, the pathways including pathways between locations within the facility, and the locations including a location of each dispenser within the facility. The service time for a dispenser is the length of time that a service person who is located at the dispenser required to perform the service operation of refilling the dispenser from the level of consumable product the dispenser is at when the service personnel starts service to a desired level. For example, for a soap dispenser which has a replaceable cartridge that is to be removed and replaced by another cartridge with a reservoir full of soap, the service time may be estimated to be relatively constant. The service time could be estimated as based on measured times for historical servicing, as could be apparent from sensors on the dispensers preferably determining in real time the status of the dispenser, the presence of a reservoir or position of a cover for the dispenser. In other cases, for example, the time of servicing could be measured by service personnel. The facility and its floor plan are known to the computer as data. The data about the facility and its floor plan provide information including the dimensions and relative location of many relevant items including, for example, as are generally to be considered immovable items: rooms, walls, hallways, doors, stairways, elevators, escalators and other means by which service personnel may move within the facility, dispensers, wash basins, water faucets, toilets, showers, tubs, toilet stalls, and the purpose and function of each item. The data about the facility can also include information about movable items which can include: the location of any movable item including movable dispensers, personnel, mobile carts carrying consumable products for dispensers and other items for service tasks. From such location information, one or more pathways can be proposed, selected and/or established for service personnel to move along to move from a start location from any one location to a finish location at any second location. More than one pathway may be possible for moving between any start location and a finish location. Each of the pathway start location and pathway finish location may be any location in the facility including the location of any washroom, of any service personnel, of any dispenser, of any room or of any mobile item.

A travel time is determined for each pathway. For example, with the computer having data representing the location of the pathway start location and the pathway finish location, and the path that is to be followed within the facility for that pathway, then the distance of the pathway and the items represented by the pathway can be used to estimate with an expected velocity over varying segments of the pathway of movement of the personnel, for example, a typical walking personnel to move along the pathway, including velocity and/or times to mount or descend stairs or elevators, etc. The pathway time may merely be calculated in whole or in part based on data about the facility and an estimated velocity of the personnel, and/or may preferably be determined based at least in part on historical data about movement recorded earlier regarding times for movement along portions of the pathway or similar pathways times and/or using real time sensing of personnel moving within the facility along portions of the pathway.

The method may include providing one or more product storage capabilities within the facility, with the locations including a location of each product storage capability. Preferably, the product storage capabilities include a mobile storage cart, and the method includes monitoring in real time the location of each mobile storage cart within the facility and wherein the locations including the location of each mobile storage cart within the facility as monitored in real time. Preferably, the method includes storing the consumable product at the product storage capabilities, and monitoring the consumable product at each product storage capability and including for each servicing operation establishing a listing of consumable product required to perform the servicing operation with time, including selecting the product storage capability from which the consumable product for each servicing operation is to be supplied to fulfill the listing with time.

The method may include monitoring in real time the location of each service personnel within the facility and wherein the locations including the location of each service of each personnel within the facility are monitored in real time.

The method preferably includes for each servicing operation establishing a route for each selected service personnel for that servicing operation by selecting successive of the pathways for each service personnel to travel along to service the selected group of the dispensers as a function which (a) minimizes the sum of the travel times of the pathways of the route and the service times for each dispenser serviced and (b) provides for service of each of the selected group of dispensers before the consumable product available in any dispenser is expected to reach the refill value. A route is a succession of successive pathways that a service personnel moves along to move from a route start location to a route finish location. The route may provide for movement between only two locations or between a plurality of locations, for example, 2 to any larger number, for example, 10, 20, 40 or 80 or more locations. At each location, the service personnel may perform a service function selected from a wide variety of service functions but notably including in respect of the dispensers, the service functions of refilling the consumable product in the dispenser and checking the status of the dispenser.

In a simple example, a route may be desired for movement of a service personnel merely between a first location and a second location with a dispenser at the second location to have a service function of refilling the dispenser performed on it. If there is more than one pathway between the first location and the second location, then the pathway selected for the route will be the pathway with the lowest pathway time. The route time will be the sum of the selected pathway time and the service time of performing the service function on the dispenser. The performing of the service function on the one dispenser is to be performed before the consumable product available in the dispenser is expected to reach the refill value. The point in real time when the dispenser is to reach the refill value is known. Therefore, the service personnel needs to commence the route at a route start time which is at least as early as a time that is in advance of the refill time by a time equal to the route time. Thus, the route including its pathways and a route start time can be selected to refill the dispenser before its refill time.

In a second example, a route may be desired for movement of a service personnel to move from a route start location to service a first dispenser at a first location and a second dispenser at second location with each dispenser to have a service function of refilling the dispenser performed on it. The computer will consider the number of different pathways from the route start location to the first dispenser, from the route start location to the second dispenser and between the first dispenser and the second dispenser. By a trial and error calculation method, the computer can calculate the route time for each possible succession of pathways that move a personnel to both the dispensers and for each possible succession of pathways representing the route a dispenser service time that is after a route start time when the service function is performed at each dispenser. The pathways and route start time can be selected by performing trial and error calculations so as to select as the route, a route with a route start time and one of the succession of pathways that has a service time for each dispenser at least as early as its refill time and also has the lowest route time.

The method may include selecting the number of service personnel, and selecting a work shift schedule which establishes a start time and stop time of a work shift for each service personnel when each service personnel will be available for servicing, and periodically establishing a cost per shift of each service personnel, and in a calculation step performing an optimizing calculation which over a selected period of time for the servicing of all dispensers determines the routes required to service all dispensers and a sum of the costs of the shifts of all service personnel, having regard to a selected input matrix of values for the capacity of each dispenser, the refill value for each dispenser, the number of service personnel, the shifts, and the start and stop times for the shifts. The calculation step includes repeatedly varying the selected input matrix values and repeating the calculation step, with a comparing of the sum of the costs of the shifts of all service personnel for each calculation step and identifying one of the selected input matrix values as an optimum input matrix values that minimizes the sum of the costs of the shifts of all service personnel. Preferably, the method includes modifying the method to adopt the optimum input matrix values including modifying the dispensers to provide for the optimum capacity of each dispenser if different than the then existing capacity of each dispenser, and operating the facility with the selected input matrix values for the refill value for each dispenser, number of service personnel, the shifts, and the start and stop times for the shifts.

Preferably, the method is carried out such that when due to a lack of one or more of consumable product, service personnel, access of service personnel to any dispenser, or operability of any dispenser such that the servicing operations cannot be established to selecting successive pathways for each selected service personnel to travel along to service the dispensers of the selected group of dispensers as a service function which provides for service of each of the dispensers before the refill time for each of the dispensers, then the method includes adopting an emergency mode of selecting of the service personnel, the start time and selected group of the dispensers for each servicing operation in which the selecting of the service personnel, the start time and selected group of the dispensers for each servicing operation is with the service function providing for the selection of one or more critical dispensers of the dispensers and refilling of each critical dispenser before their respective refill time. The critical dispensers are preferably selected based on various criterion that may apply to the facility. For example, in a situation where there is an increased risk of infection critical dispensers may be selected as dispensers of hand cleaning fluids and hand disinfectant fluids as critical dispensers which are to be refilled so as to be kept with available supply at all times even though there is not enough servicing capacity, for example, to service or refill other dispensers such as waste bins. As another example, hypothetically, if service personnel are limited in numbers and cannot refill all dispensers before their refill time, dispensers of toilet paper may be designated as critical so that all toilet paper dispensers will be timely refilled. The method also preferably includes establishing a series of successive of the servicing operations, wherein the selecting of the service personnel, the start time and selected group of the dispensers for each servicing operation is with the service function providing for service of each critical dispensers before their respective refill time and providing for servicing of each critical dispenser which would not be selected for refilling in a given servicing operation based on the refill time of each critical dispenser but are selected so as to extend the refill time for each critical dispenser by which each critical dispenser needs to be refilled in a subsequent servicing operation.

The present invention in another aspect provides a method of managing a plurality of washrooms in a facility for servicing by service personal. The method comprises various steps.

As one step, the method includes providing in a facility a plurality of washrooms, each at a fixed location within the facility with each washroom having one or more dispensers of consumable product and with each dispenser having a maximum capacity for the consumable product. As one example, the facility may have offices or various rooms of which some may comprise washrooms by reason of having one or more dispensers of consumable product such as hand cleaning fluid dispensers of, for example, liquid soap or alcohol based disinfectant fluid from reservoirs that contain the consumable product, and which reservoirs have a capacity to hold a maximum volume. The dispensers may also comprise dispensers of paper consumable products such as paper hand towels and toilet paper as in rolls or sheets with each dispenser having a capability to hold a maximum capacity of the paper product. The dispensers also include waste bins with a maximum capacity to hold a maximum volume of waste.

The method includes the step of providing one or more service personnel for replenishing the consumable product in the dispensers. The service personnel are, for example, one or more persons or employees who have the capability to move about the facility and perform various service operations as may be desired.

The method includes establishing for each dispenser a predictive consumption profile representing the product estimated to be available in each dispenser with time into the future. For each dispenser, the consumable product in the dispenser is determined at a point in time. For example, preferably, the dispenser has a sensor that measures the amount of the consumable product in the dispenser at a known time and, for example, communicates this data to a central computer or processor. Preferably, the sensor measures the amount of consumable product in the dispenser in real time and communicates to the computer in real time. As another example, the dispenser may be filled to a known level with the consumable product by a service personnel, often to the maximum capacity for the dispenser and the service personnel communicates the filling, the level to which there is filling and the time of filling to the computer. For each dispenser, the consumption of its consumable product is determined at different points in time. The consumption represents the reduction of the consumable product in the dispenser with time. With a dispenser with real time sensing of the amount of consumable product in the dispenser is known with the passage of time and, at any time, the rate at which consumable product has been dispensed with time can be used to predict based on historical data when the consumable product in the dispenser at any time may be expected to be reduced to nil at some future time. Historical data from repeated cycles of filling the dispenser and use of the dispenser can permit the calculation of predictive formulas which estimate a predictive consumption profile for the dispenser describing the amount of consumable product in the dispenser as a function of time. For dispensers that do not have sensors or real time sensing, dispensing historical data as available on the dispenser can be used to estimate a predictive consumption profile. The data to be used may be lesser data points than with a dispenser with real time sensing limited possibly to data on when the dispenser was filled, to what extent and when the dispenser was next observed and the amount of consumable product in the dispenser when next observed. Dispensers without sensors may nevertheless come to have developed an accurate consumption predictive profile with time as the amount of historical data available to the computer increases.

The method includes establishing for each dispenser a refill value for the consumable product available in each dispenser. The refill value for a dispenser is the amount of the consumable product desired to be in the dispenser at the time that the dispenser is to be serviced by service personnel to refill the dispenser. The refill value may vary widely and be selected, for example, in a range of from 0% to 50%, without limiting the refill value. For example, in a toilet stall which has one dispenser of toilet paper, the refill value may be selected so that even if consumption may vary widely from the predictive profile for the dispenser, there will be with a high probability at least some toilet paper in a private toilet stall at all times. The refill value may be selected to be 15 to 30%, for example, as towards erring on a probability basis on having at least some toilet paper in the stall at all times and considering having at least some toilet paper as important. In a washroom with a permanent water supply with two or more dispensers of hand cleaning soap communally available and visible to each user, each dispenser may be selected to have a refill value of say 0% to 10% expecting that on a probability basis that at least one of the dispensers may have at least some soap and considering having at least some soap not critical since typically a user's hands could be washed merely with water.

The method includes establishing for each dispenser a refill time when the consumable product available in each dispenser is expected to reach the refill value as a function of the predictive consumption profile for that dispenser. Given that the quantity of consumable product in the dispenser has been determined at a known time, and given that the consumptive profile of the dispenser has been established, the consumptive profile is used to estimate the time from when the quantity of consumable product is known in the dispenser to calculate a time when the quantity of consumptive product in the dispenser will equal the refill value for the dispenser a selected refill value for a dispenser.

The method includes establishing for each dispenser a service time required for the service personnel to refill the consumable product in that dispenser. The service time for a dispenser is the length of time that a service personnel who is located at the dispenser is required to perform the service operation of refilling the dispenser from the level of consumable product the dispenser is at when the service personnel starts service to a desired level. For example, for a soap dispenser which has a replaceable cartridge that is to be removed and replaced by another cartridge with a reservoir full of soap, the service time may be estimated to be relatively constant. The service time could be estimated as based on measured times for historical servicing, as could be apparent from sensors on the dispensers preferably determining in real time the status of the dispenser, the presence of a reservoir or position of a cover for the dispenser. In other cases, for example, the time of servicing could be measured by service personnel.

The method includes determining one or more pathways for service personnel to travel between each washroom within the facility and a travel time for each pathway. The facility and its floor plan are known to the computer as data. The data about the facility and its floor plan provide information including the dimensions and relative location of many relevant items including, for example, as are generally to be considered immovable items: rooms, walls, hallways, doors, stairways, elevators, escalators and other means by which service personnel may move within the facility, dispensers, wash basins, water faucets, toilets, showers, tubs, toilet stalls, and the purpose and function of each item. The data about the facility can also include information about movable items which can include: the location of any movable item including movable dispensers, personnel, mobile carts carrying consumable products for dispensers and other items for service tasks. From such location information, one or more pathways can be proposed, selected and/or established for service personnel to move along to move from a start location from any one location to a finish location at any second location. More than one pathway may be possible for moving between any start location and a finish location. Each of the pathway start location and pathway finish location may be any location in the facility including the location of any washroom, of any service personnel, of any dispenser, of any room or of any mobile item.

A travel time is determined for each pathway. For example, with the computer having data representing the location of the pathway start location and the pathway finish location, and the path that is to be followed within the facility for that pathway, then the distance of the pathway and the items represented by the pathway can be used to estimate with an expected velocity over varying segments of the pathway of movement of the personnel, for example, a typical walking personnel to move along the pathway, including velocity and/or times to mount or descend stairs or elevators, etc. The pathway time may merely be calculated in whole or in part based on data about the facility and an estimated velocity of the personnel, and/or may preferably be determined based at least in part on historical data about movement recorded earlier regarding times for movement along portions of the pathway or similar pathways times and/or using real time sensing of personnel moving within the facility along portions of the pathway.

The method includes establishing a route for each service personnel by selecting successive of the pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value. A route is a succession of successive pathways that a service personnel moves along to move from a route start location to a route finish location. The route may provide for movement between only two locations or between a plurality of locations, for example, 2 to any larger number, for example, 10, 20, 40 or 80 or more locations. At each location, the service personnel may perform a service function selected from a wide variety of service functions but notably including in respect of the dispensers the service functions of refilling the consumable product in the dispenser and checking the status of the dispenser.

In a simple example, a route may be desired for movement of a service personnel merely between a first location and a second location with a dispenser at the second location to have a service function of refilling the dispenser performed on it. If there is more than one pathway between the first location and the second location, then the pathway selected for the route will be the pathway with the lowest pathway time. The route time will be the sum of the selected pathway time and the service time of performing the service function on the dispenser. The performing of the service function on the one dispenser is to be performed before the consumable product available in the dispenser is expected to reach the refill value. The point in real time when the dispenser is to reach the refill value is known. Therefore, the service personnel needs to commence the route at a route start time which is at least as early as a time that is in advance of the refill time by a time equal to the route time. Thus, the route including its pathways and a route start time can be selected to refill the dispenser before its refill time.

In a second example, a route may be desired for movement of a service personnel to move from a route start location to service a first dispenser at a first location and a second dispenser at second location with each dispenser to have a service function of refilling the dispenser performed on it. The computer will consider the number of different pathways from the route start location to the first dispenser, from the route start location to the second dispenser and between the first dispenser and the second dispenser. By a trial and error calculation method, the computer can calculate the route time for each possible succession of pathways that move a personnel to both the dispensers and for each possible succession of pathways representing the route a dispenser service time that is after a route start time when the service function is performed at each dispenser. The pathways and route start time can be selected by performing trial and error calculations so as to select as the route, a route with a route start time and one of the succession of pathways that has a service time for each dispenser at least as early as its refill time and also has the lowest route time.

The method preferably includes providing one or more offices within the facility where one or more service personnel are located when not servicing the dispensers. The offices may, for example, be rooms or merely locations within the facility where service personnel may wait when they are not on routes. The locations of the offices can be useful if there is not any capability to monitor in real time the location of personnel. The locations of offices can also be useful as setting a preferred route finish location towards returning service personnel to their offices after any route. The method can include setting as the route start location and/or the route finish location one or another of the offices and determining a preferred route with the pathways including between each office and other locations and determining one or more pathways for service personnel to travel between each office and the washrooms or other locations within the facility and a travel time for each pathway. The method includes establishing the route for each service personnel including as the pathways both the pathways for service personnel to travel between each washroom within the facility and the pathways for service personnel to travel between each office and the washrooms within the facility by selecting successive of the pathways for each service personnel to travel along to service dispensers as a function which (a) minimizes the sum of the travel times of the pathways of the route and the service times for each dispenser serviced, and (b) provides for service of each of the dispensers before the consumable product available in any dispenser is expected to reach the refill value.

The method preferably includes providing as one or more locations one or more product storage spaces in the facility where consumable product can be stored and accessed by the service personnel. The method includes determining one or more pathways for service personnel to travel between each product storage space and each washroom or other locations within the facility and a travel time for each pathway. The method includes storing the consumable product at the storage spaces, and preferably monitoring the consumable product at each storage space. The location and availability of consumable product in the storage spaces is preferably used as part of an inventory control system towards ensuring that inventory of consumable product is available to service personnel as is required to perform a service operation of refilling a dispenser. The inventory system preferably monitors the inventory carried by a worker in moving along any first or successive pathway as needed and expended in each service operation of the pathway as is needed in successive pathways as is available in the storage spaces and as may be picked up and added to the consumable product carried by a worker by each location that is a storage space. The method includes establishing the route for each service personnel including both the pathways for service personnel to travel between each product storage space and each washroom or other location within the facility and the pathways for service personnel to travel between each washroom or other location within the facility, and the pathways for service personnel to travel between each office and the washrooms or other locations within the facility by selecting successive of the pathways for each service personnel to travel along to service dispensers as a function which (a) minimizes the sum of the travel times of the pathways of the route and the service times for each dispenser serviced, (b) provides for service of each of the dispensers before the consumable product available in any dispenser is expected to reach the refill value, and maintains an inventory of consumable product carried by a service personnel adequate to perform each next successive service operation. Preferably, the method includes monitoring in real time the consumable product available in each dispenser and/or at each storage space including consumable product carried with a service personnel.

The method preferably includes selecting the number of service personnel, and selecting a work shift schedule which establishes the start time and stop time of a work shift for each service personnel when each service personnel will be available for servicing. For example, the routes that are to be calculated and selected can have a one variable the number of service personnel available at any time. The calculation of any route may be performed firstly assuming but one service personnel, or with two personnel or with any number of personnel. The trial and error route calculations will be able to determine, for example, if it may be possible or impossible to service all dispensers for refilling before the refill times with calculations based on the availability of one, two or more service personnel over selected time periods. These time periods may be considered comprised of a work shift for each service personnel which work shifts have a shift start time and a shift end time and may be unique for each service personnel or may be similar time periods, for example, standard work shifts for a facility. The calculation of routes will provide for route selection preferably with an optimization of the number of service personnel working selected shifts with selected start and finish times. The optimization may be arranged with the trial and error calculations including minimizing the number of personnel and/or the cost. Preferably, the method includes periodically establishing a cost per shift of each service personnel, and a calculation step of performing an optimizing calculation which over a selected period of time for the servicing of all dispensers or other service operations determines the routes required to service all dispensers and/or perform all desired service operations and a sum of the costs of the shifts of all service personnel, having regard to a selected input matrix of values including at least some of the capacity of each dispenser, the refill value for each dispenser, the number of service personnel, the shifts, and the start and stop times for the shifts. The method can include trial and error calculation as by repeatedly varying the selected input matrix values and repeating the calculation step, comparing the sum of the costs of the shifts of all service personnel for each calculation step and identifying one of the selected input matrix values as an optimum input matrix values that minimizes the sum of the costs of the shifts of all service personnel. The method can also include a step of modifying the method to adopt the optimum input matrix values including modifying the dispensers to provide for the optimum capacity of each dispenser if different than the then existing capacity of each dispenser, and operating the facility with the selected input matrix values for the refill value for each dispenser, number of service personnel, the shifts, and the start and stop times for the shifts. For example, some dispensers may have at one point in time a capacity, for example, a liquid dispenser may have a reservoir with a 1 liter capacity for hand cleaning fluid. Insofar as this dispenser may be used frequently and needs to be refilled frequently, then consideration is to be given to increasing the capacity of the dispenser to, say, 2 liters or adding one or more dispensers of the hand cleaning fluid at that location. Calculations can be performed with a modified hypothetical matrix values including the additional capacity of the one dispenser and/or the additional dispensers, calculations of routes required and the time of personnel and costs recalculated to determine if more favourable servicing results as to cost or personnel required or other factors and functions. Similarly, by the selective varying of the matrix values of a facility by trial and error calculations, not only can optimized servicing routes, personnel and costing be selected by the location and number of dispensers and the like can be selected towards optimization as desired.

Facilities are used in different manners at different times. For example, in a sports stadium, washroom facilities are used heavily when an event is taking place at the facility as, for example during a soccer match, but is used sparingly between events. As well, different events will result in usage of different washrooms and/or at different schedules, for example, at a business conference over a longer period of time and possibly with different washrooms seeing higher usage. The usage of washrooms will, in many office facilities, vary by day of the week and/or holiday days or other time periods unique to any facility when less workers are present. Preferably, the method includes varying the predictive consumption profile of each dispenser to accommodate special usage events of the facility over a selected period of time.

BRIEF DESCRIPTION OF THE DRAWINGS

Further aspects and advantages of the present invention will occur from the following description taken together with the accompanying drawings, in which:

FIG. 6 is a table identifying one of two exemplary washrooms by number and identifying dispensers within the washroom and their relative level of consumable product within each dispenser;

DETAILED DESCRIPTION OF THE PREFERRED EMBODIMENTS

Figure 1:
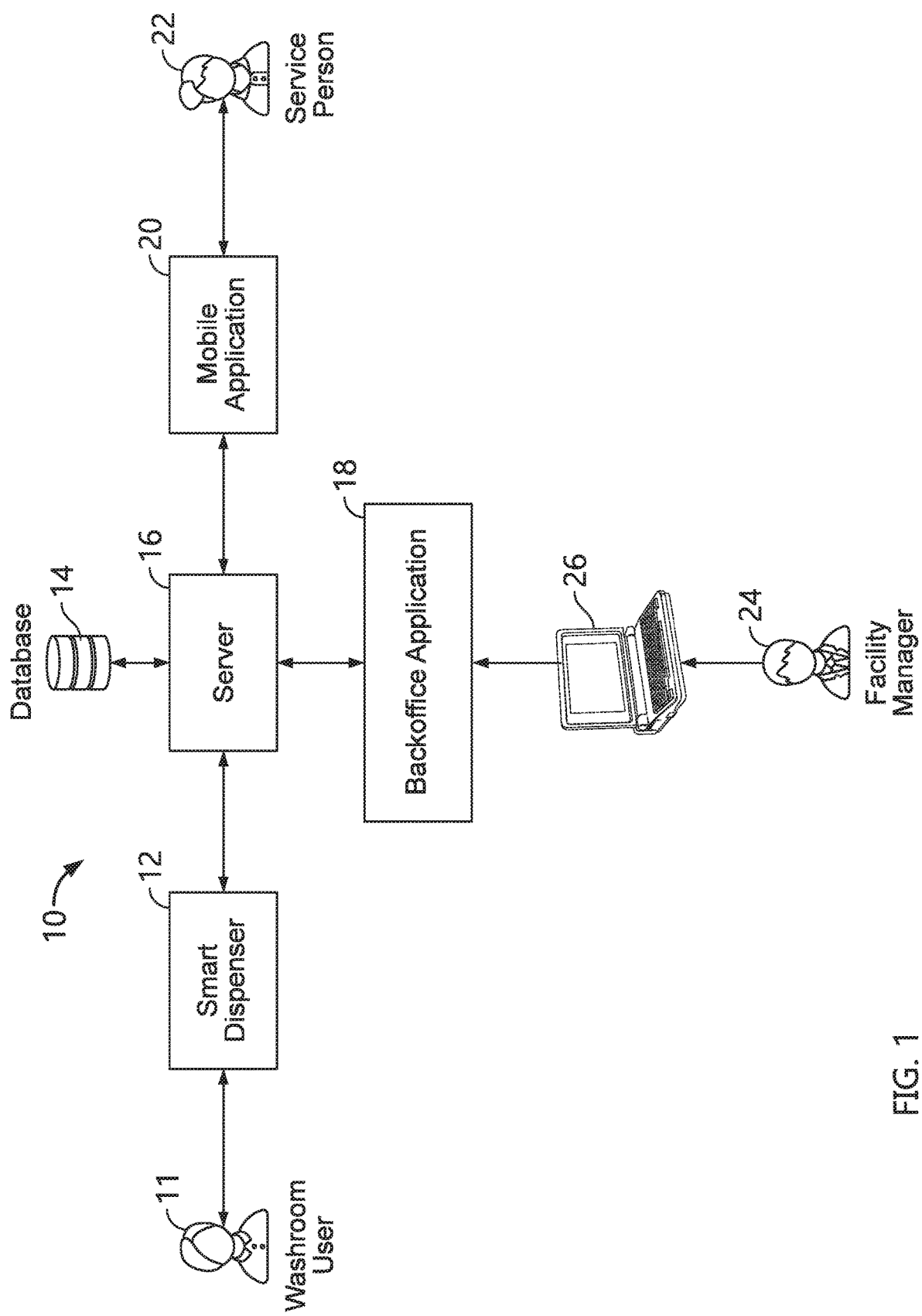
FIG. 1 is a pictorial view of a system for managing a plurality of washrooms in a facility for servicing by service personnel.

The present invention provides the smart washroom solutions that entail a system (10) as schematically shown in FIG. 1:
a washroom user (11),
one or more smart dispensers (12) capable to send their usage data as into the cloud,
a database (14),
a server (16) to act as datamining machines to process and analyze such data,
a back office application (18) to visualize, monitor and configure washroom usage and hygiene compliance data,
a mobile application (20) to, amongst other things, allocate inventory, organize the workflow and direct the tasks at hand, preferably including an inventory at hand monitoring system to monitor inventory in accordance of momentary and long term usage,
provide an electronic to-do list to the service person or personnel (22),
a facility manager (24), and
a computer (26) for interface with the facility manager (24).

Components

Dispensers

The dispensers (12) are equipped with microcontrollers which are equipped with one or several sensors to measure usage, filling level and battery voltage and to establish communication preferably a wireless connection via WI-FI or by other radio communication means.

A dispenser (12) transfers usage data with time preferably after each activation. A quality of service message including equipment status information of the dispenser (12) preferably is sent at regular time intervals.

Figure 5:
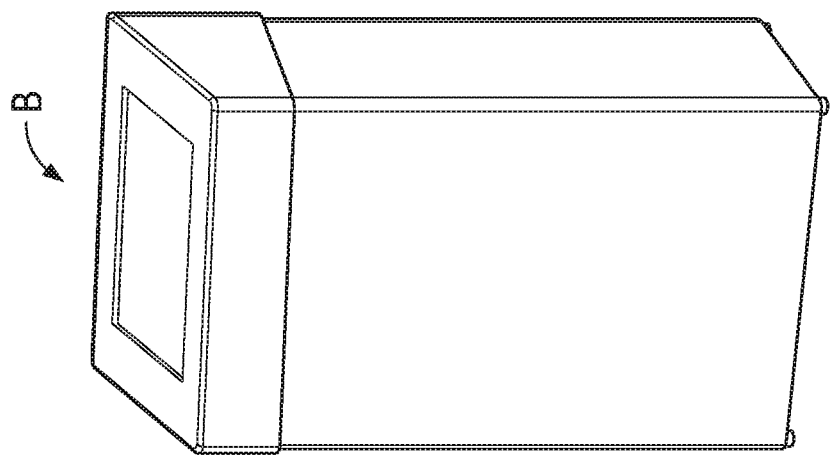
FIGS. 2, 3, 4 and 5 are, respectively, pictorial views of an exemplary paper towel dispenser, a hand cleaning fluid dispenser, a toilet paper dispenser and a waste bin suitable for placement in the washrooms of a facility for use in accordance with the present invention and, as well, a location in the facility other than washrooms.
Figure 4:
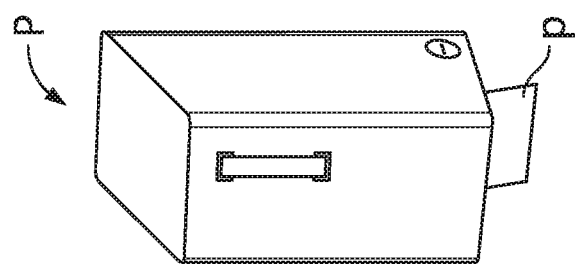
Figure 3:
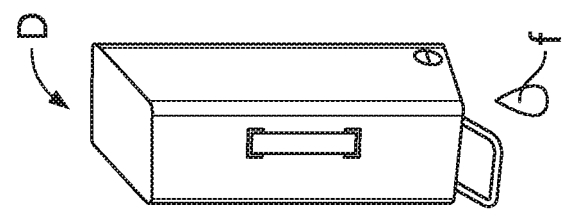
Figure 2:
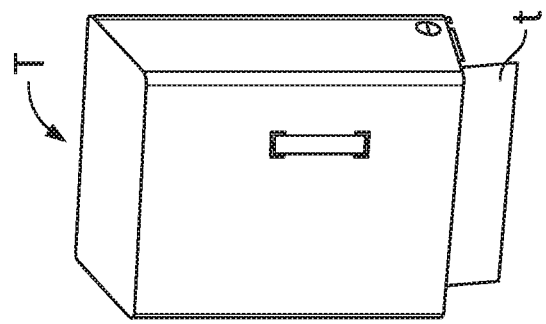

As used herein, the term "dispenser (12)" includes:
(1) paper towel dispensers (P) (as seen in FIG. 2), liquid dispensers (D) (as seen in FIG. 3), and toilet paper dispensers (T) (as seen in FIG. 4), each of which dispense a consumable product (13), namely, paper towels (p), liquid hand cleaner (f) such as liquid soap or disinfectant such as an alcohol based hand disinfectant, and toilet paper (t), respectively;
(2) waste bins (B) (as seen in FIG. 5) whose consumable product is empty waste bin space and with the waste bins monitoring their decreasing waste bin space; and
(3) air-freshener dispensers (A shown on FIG. 8).

Locations

Figure 7:
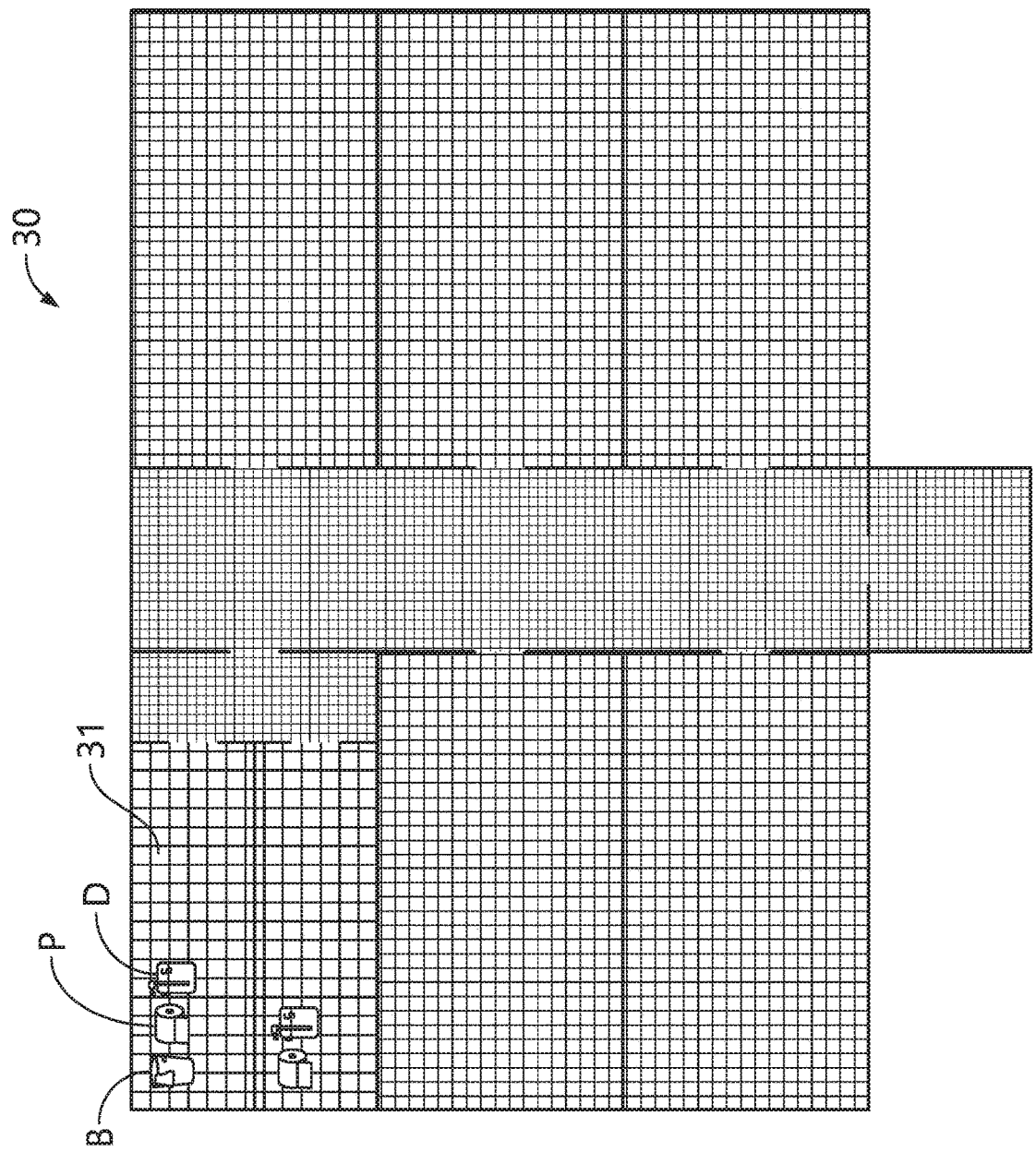
FIG. 7 is a schematic floor plan of one example of a facility in accordance with the present invention showing two washrooms with dispensers provided therein.

The facility may be one or more facilities such as a building, hospital or sports complex. One exemplary facility (30) is schematically partially shown in FIG. 7 as including two washrooms (31) with each having a paper towel dispenser (D), a toilet paper dispenser (T) and one having a waste bin (B). The locations of dispensers (12) within any facility (30), down to the washroom (31)/room (32) level, offices for service personnel (33) and product storage capabilities (34) including storage rooms (35) where product inventory is stored and mobile cleaning trolleys and service carts (36) are configured in the back office application (18) and are managed preferably via a tree structure. Each tree-node can be a physical or a logical location to give the facility manager (24) the option to manage a facility (30) as it fits their business. There is no limit to the number of dispensers (12) and/or level of tree-nodes.

Figure 8:
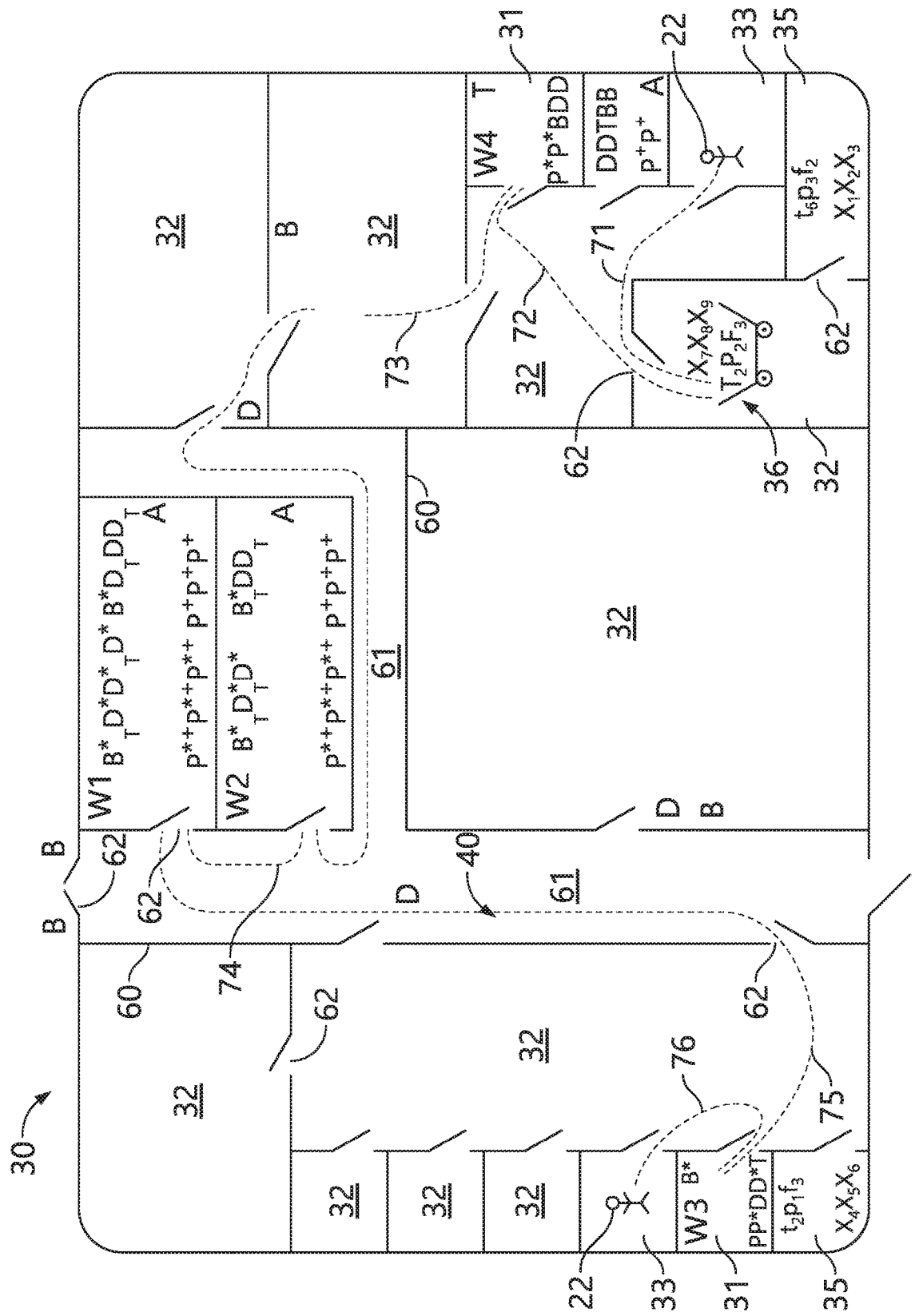
FIG. 8 is a schematic floor plan of a second example of a facility in accordance with the present invention.

Reference is made to FIG. 8 which shows a schematic plan view of a second exemplary facility (30) in accordance with the present invention. FIG. 8 shows the facility (30) as divided by walls (60) into a series of separate areas which may comprise, for example, rooms and/or hallways (61). Access to the rooms and hallways are provided by doorways, some of which are indicated as (62). The rooms include four washrooms (31) which are also indicated as W1, W2, W3 and W4; two offices (33) for service personnel; and two consumable product storage rooms (35) with the other rooms generally indicated as (32). Two service personnel (22) are shown on the floor plan, randomly as being in the offices (33) for service personnel (22). One mobile service cart (36) is randomly shown as being in a room (32). Each washroom (31) is shown as having a number of dispensers (12) identified by an upper case letter with the hand cleaning dispensers indicated as (D), the paper towel dispenser is indicated as (T), the toilet paper dispenser is indicated as (P) and the waste bin is indicated as (B). In each of the two product inventory storage rooms (35) and on the mobile storage trolley (36), there is a graphic indication of the inventory of consumable products (13) with, for ease of illustration, as small case letters with (t) representing paper towels, (p) for toilet paper and (f) for hand cleaning fluid with the number associated with each letter indicating a relative volume of each consumable product (13). The layout of the facility (30) is known as is the location of each doorway (62) and each of its washrooms (31), rooms (32), offices (33) for service personnel, and consumable product storage rooms (35). As well, preferably, facility (30) provides a system for real time determination as to the location within the facility (30) of each service personnel (22) and the mobile service cart (36).

In the facility (30) of FIG. 8, certain of the dispensers (12) are designated as key dispensers (12) and these dispensers are indicated as key dispensers (12) in FIG. 8 by having the upper case letter for each followed by an asterisk "*". The key dispensers (12) may be selected as dispensers for which there might be expected to be increased usage during a period of time and for which it is desired that the key dispenser (12) have product as through the time of a special event or for as long as possible during the special event towards preventing or at least minimizing the key dispenser (12) becoming empty or needing to be refilled during the time of the special event. The facility (30) also has certain of the dispensers indicated as critical dispensers indicated on FIG. 8 at the placement of a plus sign "+" following the upper case letter for that dispenser as, for example, with the critical toilet paper dispenser being indicated as P⁺. These critical dispensers may be selected to cover emergency situations as which may arise, for example, to ensure there is at least toilet paper at some of the toilet paper dispensers in some of the washrooms.

On FIG. 8, there is schematically shown in broken lines one hypothetical route (40) that one service personnel (22) may follow hypothetically from right hand office (33) for service personnel (22) to the left hand office (33) for service personnel (22). The hypothetical route (40) comprises successive pathways for the service personnel (22) to travel along. The hypothetical route (40) includes a number of pathways including:

a first pathway (71) to the location of the mobile service cart (36) in a first room (32);

a second pathway (72) from the first room to the washroom (31) designated W4;

a third pathway (73) from the washroom W4 to the washroom W2;

a fourth pathway (74) from the washroom W2 to the washroom W1;

a fifth pathway (75) from the washroom W1 to the washroom W3; and a sixth pathway (76) from the washroom W3 to the left hand office (33) for service personnel (22).

In addition, within each washroom, a number of pathways are provided including shorter pathways indicating the pathway of the service personnel (22) in moving between dispensers (12) within each individual washroom as, for example, to service selected of the dispensers (12) and/or to check on the level of consumable product (13) and/or the operational status of some or all of the dispensers (12).

Figure 9:
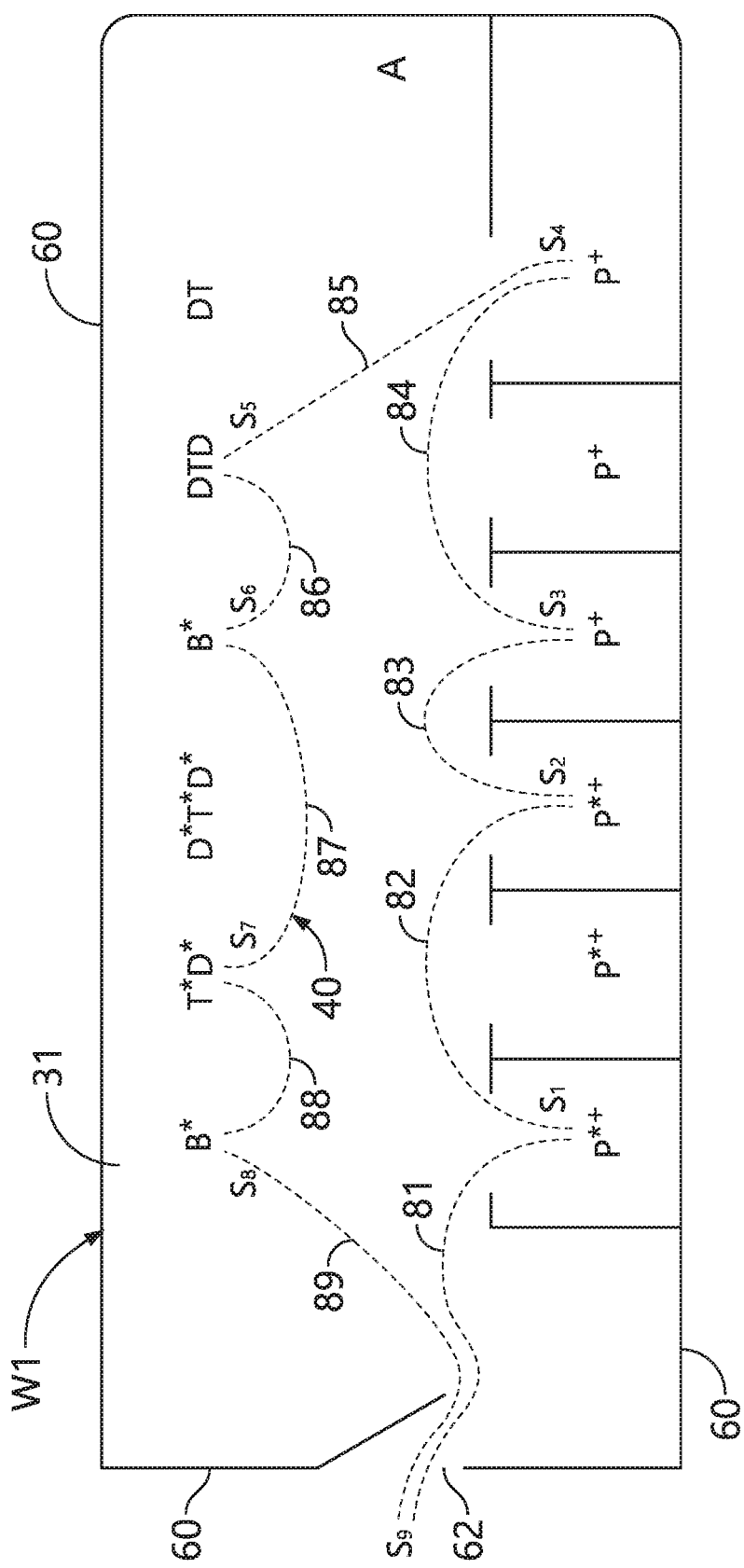
FIG. 9 is an enlarged floor plan of one washroom on the floor plan of FIG. 9.

In this regard, reference is made to FIG. 9 which shows an enlarged view of the washroom (31) designated as W1 on FIG. 1 and shows a number of pathways of a service personnel (22) in moving between the dispensers (12) within the washroom W1 as comprising individual pathways (81), (82), (83), (84), (85), (86), (87), (88) and (89) via which a service personnel (22) will move between the dispensers. As seen on FIG. 9, in this particular washroom, there is an efficiency in moving in a manner to firstly service selective of the toilet paper dispensers (P) and then subsequently to service selected of the hand cleaning fluid dispensers (D) and the waste bins (B) based on the relative location of the various dispensers (12) within the washroom. Thus, the hypothetical route (40) would include not only each of the first to sixth pathways (71) to (76) but also the pathways to rooms including, for example, in respect of the washroom W1 on FIG. 9, on a service personnel (22) moving along the route (40), the service personnel (22) will perform servicing operations at each of the dispensers or other locations. For example, on FIG. 9, various servicing operations are indicated as (S1) to (S9) indicating various servicing operations which need to be performed by the service personnel along the route (40). Each of the service operations (S1) to (S8) for each of the respective dispensers may include, for example, filling a dispenser, checking the level of consumable product in the dispenser and/or checking the operational status of the dispenser. In addition, there is shown a service operation (S9) at the doorway (62) of the washroom W1 which also indicates some service operation which is performed on exiting the washroom W1. Each of these service operations (S1) to (S9) that the service personnel (22) would perform and each of the pathways (71) to (76) and (81) to (89) along which the service personnel (22) would move are and can be assigned a time that the service personnel (22) are expected to take. The sum of the time of travel on pathways and the sum of the time of the service operations to be performed can be used to calculate an accumulative time that a service personnel (22) may be expected to move along the route (40) performing the service operations. The length of the pathways is known given the knowledge of the floor plan. A relative speed of movement of a service personnel (22) along a pathway can be assumed or calculated or measured. The location of each of the service operation is known. By providing the dispensers (12) which indicate changes to their fill levels and operational status in real time and systems to indicate the locations and the changes in the location of service personnel (22) and/or storage carts (36) in the facility (30) with time, measurements can be made as to the time it takes for a service personnel (22) to move along any pathway or perform any service operation or to perform any route and save such measurements in a historical database of such measured times and service operations. Suitable times for any route, pathway or service operations can be estimated based on historical data which has been gathered.

Tree-node datatypes for locations include:
Logical node/Physical node;
Facility;
Washroom (31)/room (32);
Product inventory storage rooms (35) and mobile storage trolleys (36);
Offices for services personnel (34).

A dispenser (12) can be attached to each of these node types.

As another example that is not shown in a drawing, there is the following:

Facility 1: Test Compliance Campus Issum
Washroom (31): Men's room floor 1
  Soap dispenser
  Disinfectant dispenser
  Toilet paper dispenser
  Paper towel dispenser
  Waste bin Disinfectant dispenser Floor 1
Garden
  Waste bin
Basement
  Product inventory storage room
  Facility 2: Office Switzerland
Floor 2
  Washroom: Men's room floor 2
    Soap dispenser
    Disinfectant dispenser
    Toilet paper dispensers
      Toilet paper dispenser stall 1
      Toilet paper dispenser stall 2
    Waste bin
Floor 1
  Disinfectant dispenser
  Product inventory storage room
    Waste bin

Service Personnel

The service personnel (22) is managed in the back office application (18). The dataset includes for each service personnel (22) staff information that may include their names, working times as in shift start and stop times and assigned facility. Administration masks make it easy to add additional service personnel (22) to the system and to assign them to a facility and or to a specific set of tasks. There is no limit in the number of service personnel (22).

The service personnel (22) preferably use a smartphone or a tablet in cooperation with the mobile application (20) to access their work to-dos. The service personnel (22) preferably need to authenticate themselves with a unique username/password combination. The system (10) keeps track of the working times, the reaction times and all information in relation with a task given to a specific service personnel (22). The information can be analyzed and monitored in the back office application (18) for specific user roles.

A single service personnel (22) can be assigned to one or more facilities (30), e.g. a janitor who serves multiple washrooms (31) every day. More than one service personnel (22) can be used.

Product Inventory Storage

The consumable product inventory level is managed in the back office application (18) preferably via the location structure tree. Preferably, the storage level of the consumable product (18) inventory is monitored with sensors whenever the levels are desired to be known, including in the storage rooms and carts. Exemplary sensors $X_1$ to $X_9$ are shown on FIG. 8 in the product storage rooms (35) and on the mobile storage cart (36). Each sensor associated with are consumable product and preferably with each sensor communicating quantity of consumable product with the server.

Rather than use sensors to monitor inventory, an Enterprise Resource Planning (ERP) system can be connected or the back office application (18) can be used manually to manage the stock of consumable product inventory storage linked to the facility (30). Used consumable materials are subtracted from the consumable product (13) storage inventory. The data can be sent to the ERP system.

An intelligent algorithm forecasts the estimated amount of consumable product (13) needed for use defined periods of time based on historical data the server (16) has gathered from the past.

Travel Paths

To calculate efficient travel paths or pathways, for example, pathways (71) to (76) and (81) to (89) for the service routes of service personnel (22) within a facility (30), the distance between the dispensers (12), the personnel offices (33) and inventory storage rooms (35) and mobile carts (36) inside a facility (30) is either established through input administrative configuration masks and/or calculated and recalculated based on the historical data for travelling times.

For multi building management, the travel paths (40) between any two buildings to be jointly managed between the facilities (30) can be calculated based on their geocoordinates related to the forecast data of upcoming tasks.

Optimized travel paths for servicing a facility (30) can include the paths and time for visits of service personnel (22) to product inventory storage rooms (35) to replenish cleaning trolleys (36) serving as mobile service carts used by the service personnel (22) to move consumable product (13) and the time required for service personnel (22) to load consumable product (13) for use, and the service time required to refill each dispenser (12).

Travel paths (40) preferably are generated automatically to match a specific service level for a facility (30) based on a predictive consumption profile for the dispensers (12) which preferably are, in part, based on historical usage data once there is enough historical data. Travel paths (40) can be adjusted to accommodate in whole or in part routes favored by the service personnel (22) and pre-scheduled routines (e.g. servicing a coffee machine). A route (40) can be generated manually as for facilities (30) without automated input from the dispensers (12) or to permit manual input of specific tasks.

Special Events

Special events include time periods when the facility (30) is subjected to different usage than normal, for example, high usage of the consumable products (13). Special events are estimated in advance and placed into the schedule in the back office application (18). If desired, the configuration of a facility (30) or the available range of dispensers (12) can be changed for a specific time frame relevant to a special event.

As an example of a special event, the washrooms (31) of a train station facility (30) close to a soccer stadium can be preconfigured for all the times of the soccer games, for example, to optimize the product inventory from running out including, for example, providing service personnel (22) and the dispensers (12) to be 100% full before the game starts.

Software

Server

The server (16) preferably receives all sensor data and stores them as time series data in a clustered NoSQL database environment. With the application of intelligent algorithms, in relation to the master data information about available service personnel (22), facilities (30) to serviced, available inventory of consumable product (13) at the local level, washrooms (31) and their dispensers (12), the server (16) as a mastermind is utilized optimising service operations and other tasks within the facilities (30). The server (16) provides for communication of the data service operations and including, for example, to the service personnel (22), preferably to their smartphones via a mobile application (20).

The server (16) preferably has a multi-tenancy capable and provides several user roles with different usage and access permissions.

Back Office Application

The back office application (18) provides a real time status quo about the monitored entities. Facilities (30), washrooms (31), dispensers (12), service personnel (22), the consumable product used and accordingly the consumable product (13) at hand are preferably tracked and prepared for interactive analysis.

The back room application (18) is preferably tailor-made for any facility manager (24) to provide the facility manager (24) with a simple web frontend to serve all their needs. For example, user-friendly configuration masks are used to show and configure each individual washroom (31) and/or dispenser (12) and to show the actual predicted or desired service levels for each. For example, reference is made to FIG. 6 showing a mask that shows two hypothetical washrooms WR1 and WR2, each with two dispensers D1 and D2 dispensing liquid soap and disinfectant, respectively, one paper towel dispenser T, one toilet paper dispenser P and one waste bin B and showing in a table for a given time the extent the consumable product in each dispenser, if full, as a percent. The table also shows the number of visitors to each washroom in a time period.

Other activities not related to dispensers (12) or sensor data about the dispensers (12), their operability, and/or their consumable product (13) can be planned and monitored by the back room application (18) as well. Such activities include scheduled task routines that allow the management and control over reoccurring activities such as, for example, floor cleaning, gardening and other tasks concerning servicing a facility (30).

Mobile Application

The service personnel (22) preferably have and use a smartphone or a tablet to wirelessly access the mobile application (20). All the service operations generated by the server algorithms are preferably shown to the assigned service personnel (22). The mobile application (20) preferably provides information about all the consumable products (13) needed for each service route to optimize the loading of the mobile cleaning trolleys (36) and to avoid unnecessary redundant routes.

Preferably, a forecast algorithm determines when the next refill/service route is needed and keep the service personnel (22) efficiently utilized.

Personnel and Anonymous Mode

The system (10) can be run in many different modes including:
The Personalized mode provides:
  Personalized servicing operation management:
    Servicing operations are getting assigned to specific service personnel (22).
  Personalized Username/Password combination.
  Tracking working and reaction times.
  Consumable product (13) usage by service personnel (22) linked to a specific person.
  All information related to a given servicing operation implicitly linked to a specific services personnel (22).
The Anonymous mode:
  Anonymous service operation management:
    Servicing operations are getting assigned to phones/anonymized accounts.
  Anonymized Username/Password combination:
    E.g. "facility 1phone1/password"
  Tracking reaction times.
  Consumable product usage by service personnel (22) linked to a "phone"/anonymized account.
  All information related to a given servicing operation implicitly linked to a specific phone/anonymized account.

Algorithms

Intelligent self-learning algorithms preferably process and analyze all received data and information about facilities (30), service personnel (22), dispensers (12), materials, product inventory storages and travel paths (40) in relation with time, preferably in real time.

Preferably, after gathering enough historical usage data during runtime the algorithms can calculate many items including, for example:
the amount of service personnel (22) needed for a facility (30) with time,
the amount of consumable product (13) needed for a facility (30) with time,
optimization of equipment/dispensers (12) in a facility (30),
the amount of required dispensers (12) during peak usage of a facility (30),
the point in time when each dispenser (12) will run empty, that is, have a nil value for consumable product (13),
the point in time when each dispenser (12) will preferably be desired to be refilled,
the point in time when scheduled tasks need to be performed, such as when floor cleaning is needed.

The algorithms preferably continuously be developed further with time and historical data input to provide more and deeper insight into the data about the facility (30) and its usage and servicing.

Advantages

Optimized Service Personnel and Optimized Material Usage

The system (10) preferably monitors and tracks, preferably in real time data regarding at least some of:
Dispenser (12) activations and their filling levels including the consumable product (13) in each dispenser with time,
Servicing operations and activities, including servicing dispensers (12) indicating which dispensers (12) need refilling or have been refilled and when,
Consumable products (13) in inventory, placed into dispensers (12) and available in each dispenser (12),
Washroom (31) usage data as measured by monitoring at least the dispensers (12) usage by monitoring consumable product (13) in selected dispensers (12) with time,
Reaction times of service personnel (22), that is, the time required for servicing dispensers (12), travel and loading inventory,
Trends regarding the usage of dispensers (12) with time.

All such data preferably is analyzed within the back office application (18) to identify potential for optimization. Such time based data is used as a foundation to detect trends and to forecast tasks and consumable products (13) needed.

Real-Time Tracking

The facility management service provider preferably is provided with a detailed insight into the washrooms (31) in their facilities (30). Preferably, the coordination of servicing task and consumable product (13) is digitalized and automated.

Automatic Task Distribution

The workload of the building manager (24) preferably is reduced significantly by the present invention by avoiding handwritten task-sheets. Preferably, the back office application (18) communicates the servicing tasks to maximize the service level and the performance of the cleaning personnel (22).

Material Tracking

All consumable products (13) present, stored or consumed within the cleaning and servicing of a facility (30) preferably are tracked and available to analyze in the back office application (18), preferably showing exactly where and how much of the consumable product (13) is available to optimize inventory and purchasing.

Improved End-User Experience

Figure 10:
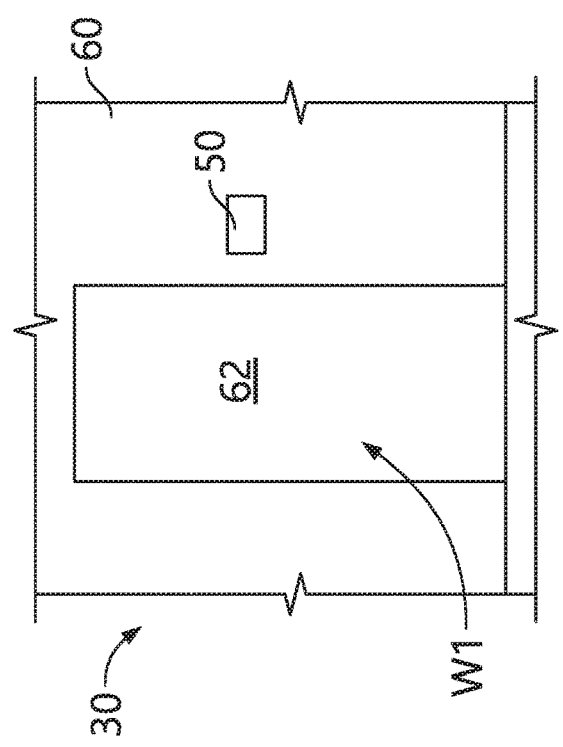
FIG. 10 is a schematic pictorial view of a screen provided at the doorway of a washroom on FIG. 9.

Preferably, as seen in FIG. 10, with use of the present invention, the end-users (11) will have a better experience while using the washrooms (31). Preferably, the avoidance or reduction of dispensers (12) having no consumable product (13) will improve the quality of service and the image of the facility (30) and the service manager (24). A tablet screen (50) may be provided at the entrance (51) to each washroom (31) indicating the state of the washroom (31) and its dispensers (12) and when they were last serviced.

Floor Cleaning

Figure 11:
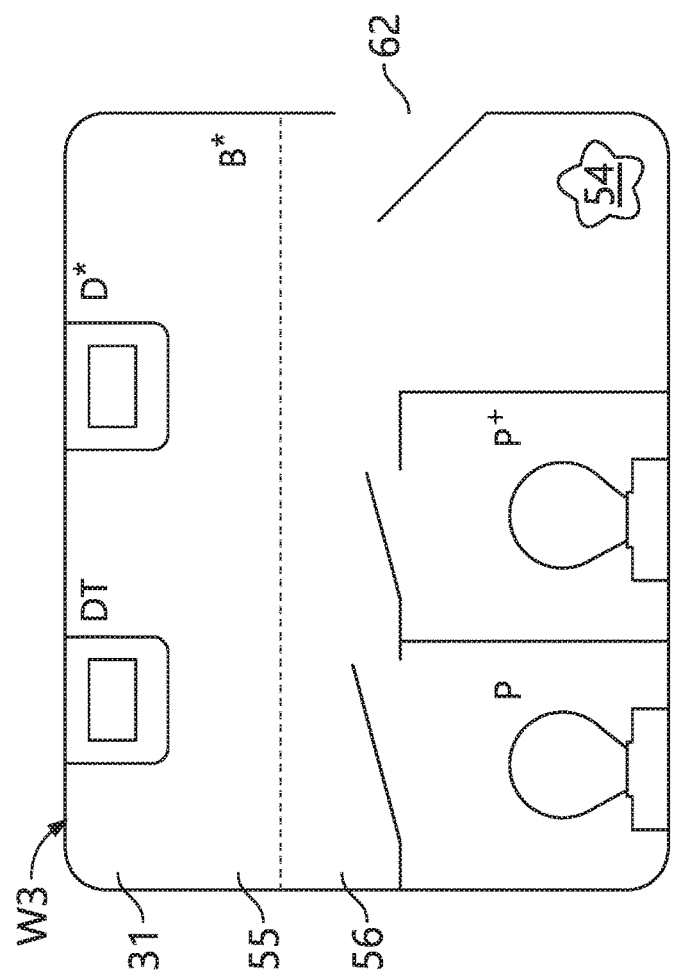
FIG. 11 is an enlarged schematic floor plan of another washroom on the floor plan of FIG. 9 shown to include a floor cleaning robot.

Preferably, as seen in FIG. 11, to automate floor cleaning, a robot (54) is provided in each washroom (31) in a storage position to execute scheduled and sensor based cleaning as directed by the system (10). For example, once a specific threshold of washroom users is exceeded as may be measured, for example, by monitoring the supply of the consumable product (13) in the dispensers (12), the robotic floor cleaning is triggered. A washroom (31) preferably will be split into two separate areas (55,56) where one will be cleaned and one will still be available to the end-user (11).

Once the cleaning of the floor in the first area (55) is finished and dry, the second area (56) will be cleaned and the end-user (11) can use the first cleaned area. When the floor cleaning of the second area is finished, the robot (54) moves itself into storage position and waits for the next scheduled and/or sensor based cleaning as directed by the system (10).

Preferably, an ERP-Systems is provided to automate the consumable product management including purchasing and to provide suggestions to the buyer.

Preferably, the system gathers data serving to time-track the service personnel (22) at least by monitoring the available consumable product (13) in the dispensers (12) as, for example, to indicate refilling.

Preferably, the system (10) includes a feedback terminal which may also comprise the tablet screen (50) shown on FIG. 10 at the exit of some washrooms (31) by which an end-user has the opportunity to send some feedback about what he liked and what he did not like about the washroom (31) and its usage including the malfunction of dispensers (12), lack of consumable product (13), lack of cleanliness and the like. The back office application (18) can be arranged to such feedback and react accordingly to identify problems and reduce reaction time.

Optimization

The following table sets out in an exemplary manner in which a system in accordance with the present invention can optimize the facility (30) and its servicing:

| Cleaning Service Personnel | Dispenser | Consumable Products |
| --- | --- | --- |
| Optimized assignment within automated servicing operation distribution. Efficient usage with reduced distances between servicing operation and avoided redundant routes. Calculation of the amount of consumable products needed to remove from a fixed inventory room and placed on the mobile trolley accordingly. | Optimized consumable product capacity of each dispenser based on analysis of historical data. Dispensers that have, for example, high or low usage can be identified and optimized accordingly to reduce the service personnel time needed to serve them. More efficient cleaning intervals based on usage data. | Result-oriented prediction of the amounts needed. Calculation based on a given budget for a facility, a washroom or several washrooms. Calculation of a budget needed based on the usage of a facility, a washroom or several washrooms. |

Various dispensers of consumable products are well known to persons skilled in the art. Known dispensers which are manually operated as by actuating a lever and those which are automatic dispensers preferably, for example, touchless dispensers in which the presence of a user's hand near the dispenser activates dispensing of the consumable product. Manual dispensers may require inspection by service personnel to determine the fill level of consumable product in the dispenser or they may have signalling systems which provide signals preferably via the Internet to a computer to indicate the status of the dispenser, for example, to indicate the level of consumable product in the dispenser, when the dispenser may be empty of consumable product, whether the dispenser is operating properly and the like. Such dispensers, whether manual or touchless, are well known to be provided with communication capabilities and sensing abilities to sense various parameters of the dispenser are well known and may be taught as, for example, in the following patents and published patent applications: US Patent Publication US 2016/0093195 to Ophardt, published Mar. 31, 2016; US Patent Publication US 2014/0253336 to Ophardt, published Sep. 31, 2014; U.S. Pat. No. 8,816,860 to Ophardt, issued Aug. 26, 2014, the disclosures of which are incorporated herein by reference.

These patents provide for electronic communication of information from the dispenser not only of dispensers in which the dispensing via an electric motor but also of manual dispensers in which dispensing is powered by manually applied forces yet with signals being developed for communication of status and activity of the dispenser.

Various dispensers and dispenser arrangements are well known which provide for sensing as of the consumable product in a dispenser, for example, fluid remaining in a fluid dispenser and the amount of paper remaining as in a paper towel dispenser or a toilet paper dispenser. Exemplary are U.S. Pat. No. 9,027,788 to Ophardt, issued May 12, 2015; U.S. Pat. No. 8,201,707 to Ophardt, issued Jun. 19, 2012 and U.S. Pat. No. 8,215,523 to Ophardt, issued Jul. 10, 2012, the disclosures of which are incorporated herein by reference. These and other previously known arrangements teach monitoring levels of consumable products in dispensers as with time and determining directly or indirectly the fill level for a dispenser at any time and determining a time when a dispenser may be expected to be empty of consumable product.

It is well known to provide fluid dispensers such as hand cleaner soap dispensers which, to replenish the supply of fluid in the dispenser, a reservoir in the dispenser is refilled or a reservoir is replaced by a refill reservoir which may or may not have a pump assembly attached. Such fluid dispenser are shown, for example, in U.S. Pat. No. 9,437,103 to Ophardt, issued Sep. 6, 2016, the disclosure of which is incorporated herein by reference.

Previously known systems and methods are well known for monitoring the location of personnel and/or movable objects within a facility including, for example, having service personnel and movable objects carry sensors that monitor at least the movement and location of the service personnel within a facility, preferably in real time and communicate data to a central computer. One example is the method and system taught by U.S. Pat. No. 7,898,407 to Hufton, issued Mar. 1, 2011, the disclosure of which is incorporated herein by reference and which teaches various arrangements using IR detectors and badges carried on users and which is readily adapted for use with other detector systems including WiFi, Bluetooth and the like.

While the invention has been described with reference to preferred embodiments, many modifications and variations will now occur to a person skilled in the art. For a definition of the invention, reference is made to the following claims.

We claim:

1. A system for managing a plurality of washrooms in a facility for servicing by service personnel comprising:

a server; and a plurality of smart dispensers, each for dispensing a consumable product at different locations fixed within the facility, and with each smart dispenser having a maximum capacity for the consumable product, wherein each smart dispenser has a system for monitoring a supply of the consumable product available in the smart dispenser and communicating data regarding the consumable product available in the smart dispenser to the server;

wherein the server establishes for each smart dispenser a predictive consumption profile representing the consumable product estimated to be available in each smart dispenser with time into the future, wherein the server establishes for each smart dispenser a refill value for the consumable product available in each smart dispenser, wherein the server establishes for each smart dispenser a refill time when the consumable product available in each smart dispenser is expected to reach the refill value as a function of the predictive consumption profile for that smart dispenser, wherein the server establishes for each smart dispenser a service time required for service personnel to refill the consumable product in that smart dispenser, wherein the server determines one or more pathways for service personnel to travel between each washroom within the facility and a travel time for each pathway, wherein the server establishes a route for each service personnel by selecting successive pathways for each service personnel to travel along to service smart dispensers as a function which (a) minimizes the sum of the travel times of the pathways of the route and the service times for each smart dispenser serviced, (b) provides for service of each of the smart dispensers before the consumable product available in any smart dispenser is expected to reach the refill value;

wherein there are one or more offices within the facility where one or more service personnel are located when not servicing the smart dispensers, wherein the server determines one or more pathways for service personnel to travel between each office and the washrooms within the facility and a travel time for each pathway, and wherein the server establishes the route for each service personnel including both the pathways for service personnel to travel between each washroom within the facility and the pathways for service personnel to travel between each office and the washrooms within the facility by selecting successive of the pathways for each service personnel to travel along to service smart dispensers as a function which (a) minimizes the sum of the travel times of the pathways of the route and the service times for each smart dispenser serviced, and (b) provides for service of each of the smart dispensers before the consumable product available in any smart dispenser is expected to reach the refill value.

2. The system according to claim 1, wherein the facility has one or more product storage spaces;

wherein the server determines one or more pathways for service personnel to travel between each product storage space and each washroom within the facility and a travel time for each pathway;

wherein each product storage space has a system for monitoring a supply of the consumable product available in the product storage space and communicating data regarding the consumable product available in the product storage space to the server;

wherein the server establishes the route for each service personnel including the pathways for service personnel to travel between each product storage space and each washroom within the facility, the pathways for service personnel to travel between each washroom within the facility, and the pathways for service personnel to travel between each office and the washrooms within the facility by selecting successive of the pathways for each service personnel to travel along to service the smart dispensers as a function which (a) minimizes the sum of the travel times of the pathways of the route and the service times for each smart dispenser serviced, and (b) provides for service of each of the smart dispensers before the consumable product available in any smart dispenser is expected to reach the refill value.

3. The system according to claim 1, wherein the facility has one or more product storage spaces;
   wherein the server determines one or more pathways for service personnel to travel between each product storage space, each office and each washroom within the facility and a travel time for each pathway;
   wherein each product storage space has a system for monitoring a supply of the consumable product available in the product storage space and communicating data regarding the consumable product available in the product storage space to the server;
   wherein the server establishes the route for each service personnel including the pathways for service personnel to travel between each product storage space, each office and each washroom within the facility, the pathways for service personnel to travel between each washroom within the facility, and the pathways for service personnel to travel between each office and the washrooms within the facility by selecting successive of the pathways for each service personnel to travel along to service the smart dispensers as a function which (a) minimizes the sum of the travel times of the pathways of the route and the service times for each smart dispenser serviced, and (b) provides for service of each of the smart dispensers before the consumable product available in any smart dispenser is expected to reach a nil value.

4. The system according to claim 1, further comprising a location system for monitoring in real time a location of each service personnel within the facility.

5. The system according to claim 4, wherein the server monitors the supply of the consumable product available in each smart dispenser in real time.

6. The system according to claim 5, wherein the server modifies the route in real time having regard to the real time location of each service personnel within the facility and the consumable product available in each smart dispenser in real time.

7. The system according to claim 1, wherein for each route, the server sets one of the one or more offices as a route finish location.

8. The system according to claim 1, wherein for each route, the server sets one of the one or more offices as a route start location.

9. The system according to claim 1, wherein the server establishes for each smart dispenser the predictive consumption profile based on a function of (a) historical monitoring of each smart dispenser and (b) predicted usage of each smart dispenser.

10. The system according to claim 1, wherein the server establishes one or more servicing operations,
    each servicing operation having one of the service personnel, a start time, a selected group of the smart dispensers, and the route for each service personnel;
    wherein the server selects the service personnel, the start time, the selected group of the smart dispensers, and the route for each servicing operation as a service function which provides for service of each of the smart dispensers to replenish the consumable product in the smart dispensers before their respective refill time.

11. The system according to claim 10, wherein the system selects the service personnel, the start time, the selected group of the smart dispensers, and the route for each servicing operation to provide for servicing of predetermined one or more key smart dispensers of the smart dispensers to extend the refill time for each key smart dispenser.

12. The system according to claim 11, wherein the server establishes a series of successive of the servicing operations,
    wherein the server selects the service personnel, the start time, the selected group of the smart dispensers, and the route for each servicing operation with the service function providing for service of each of the smart dispensers before their respective refill time and providing for servicing of each key smart dispenser which would not be selected for refilling in a given servicing operation based on the refill time of each key smart dispenser, but are selected so as to extend the refill time for each key smart dispenser by which each key smart dispenser needs to be refilled in a subsequent servicing operation.

13. The system according to claim 12, wherein the servicing of each key smart dispenser to extend the refill time for each key smart dispenser extends the refill time for that key smart dispenser to a time after a predetermined time.

14. The system according to claim 13, wherein the server selects the predetermined time having regard to at least one factor selected from the group of:
    (a) ensuring the consumable product is available in each key smart dispenser until after a period of time in which usage of each key smart dispenser is predicted to be high,
    (b) ensuring the consumable product is available in each key smart dispenser until after a period of time in which availability of the consumable product in each key smart dispenser is determined to be of high importance,
    (c) ensuring the consumable product is available in each key smart dispenser until after a period of time in which servicing of each key smart dispenser is not possible,
    (d) ensuring the consumable product is available in each key smart dispenser until after a period of time in which the service personnel are not available for servicing of each key smart dispenser, and
    (e) ensuring the consumable product is available in each key smart dispenser until after a period of time in which consumable product is not available for servicing of each key smart dispenser.

15. The system according to claim 2, further comprising a location system for monitoring in real time a location of each service personnel within the facility.

16. The system according to claim 15, wherein the server monitors the supply of the consumable product available in each smart dispenser in real time.

17. The system according to claim 16, wherein the server modifies the route in real time having regard to the real time location of each service personnel within the facility and the consumable product available in each smart dispenser in real time.

18. The system according to claim 17, wherein for each route, the server sets one of the one or more offices as a route finish location.

19. The system according to claim 18, wherein for each route, the server sets one of the one or more offices as a route start location.

20. The system according to claim 19, wherein the server establishes for each smart dispenser the predictive consumption profile based on a function of (a) historical monitoring of each smart dispenser and (b) predicted usage of each smart dispenser;
    wherein the server establishes one or more servicing operations, each servicing operation having one of the service personnel, a start time, a selected group of the smart dispensers, and the route for each service personnel; and wherein the server selects the service personnel, the start time, the selected group of the smart dispensers, and the route for each servicing operation as a service function which provides for service of each of the smart dispensers to replenish the consumable product in the smart dispensers before their respective refill time, and provides for servicing of predetermined one or more key smart dispensers of the smart dispensers to extend the refill time for each key smart dispenser.

\* \* \* \* \*